(12) United States Patent

Bedsted et al.

(10) Patent No.: US 12,617,494 B2

(45) Date of Patent: May 5, 2026

(54) ADJUSTABLE TETHER LINE SYSTEMS AND SECUREMENT METHODS

(71) Applicant: MISSION Corp., Eden Prairie, MN (US)

(72) Inventors: Caleb Bedsted, Park Rapids, MN (US); Corey Uchtman, Wayzata, MN (US); Kristopher Clover, Minnetrista, MN (US); Camron Olson, Mendota Heights, MN (US); Mark Bohlig, Minnetonka, MN (US)

(73) Assignee: MISSION Corp., Eden Prairie, MN (US)

( * ) Notice: Subject to any disclaimer, the term of this patent is extended or adjusted under 35 U.S.C. 154(b) by 0 days.

(21) Appl. No.: 19/375,609

(22) Filed: Oct. 31, 2025

(65) Prior Publication Data

US 2026/0054802 A1 Feb. 26, 2026

Related U.S. Application Data

(63) Continuation-in-part of application No. 19/273,520, filed on Jul. 18, 2025, now Pat. No. 12,459,604.

(51) Int. Cl.

| | |
|---|---|
| *B63B 21/04* | (2006.01) |
| *A62B 1/08* | (2006.01) |
| *A62B 1/14* | (2006.01) |
| *A62B 1/16* | (2006.01) |
| *A62B 35/00* | (2006.01) |

(Continued)

(52) U.S. Cl.

CPC ................ *B63B 21/04* (2013.01); *A62B 1/08* (2013.01); *A62B 1/14* (2013.01); *A62B 1/16* (2013.01); *A62B 35/0081* (2013.01); *B63B*

*21/08* (2013.01); *B63B 21/20* (2013.01); *B65H 69/04* (2013.01); *F16G 11/02* (2013.01); *F16G 11/14* (2013.01); *B63B 2205/00* (2013.01)

(58) Field of Classification Search

CPC ......... B63B 21/04; B63B 21/08; B63B 21/20; B63B 2021/203; B63B 2205/00; A62B 1/00; A62B 1/08; A62B 1/10; A62B 1/14; A62B 35/0081; A62B 35/0093; B65H 69/04; B65H 69/043; E06C 7/186; E06C 7/187; F16G 11/02; F16G 11/14

See application file for complete search history.

(56) References Cited

U.S. PATENT DOCUMENTS

| | | | | |
|---|---|---|---|---|
| 5,896,623 A | * | 4/1999 | Martin | .................... F16L 3/233 |
| | | | | 24/3.13 |
| 6,712,181 B2 | | 3/2004 | Nichols | |

(Continued)

FOREIGN PATENT DOCUMENTS

| | | | | | |
|---|---|---|---|---|---|
| GB | 2259855 A | * | 3/1993 | ............... | A62B 1/16 |

*Primary Examiner* — Ajay Vasudeva

(74) *Attorney, Agent, or Firm* — Corey R. Uchtman

(57) ABSTRACT

An adjustable tethering system is disclosed that includes a primary line, a secondary line, and a bail release feature. The secondary line is wound about the primary line to form a frictional locking arrangement that resists translation of the secondary line along the primary line when tension is applied. The bail release feature is operable to be manipulated by a user to reduce the constriction of the windings about the primary line, thereby enabling controlled transition of the system from a secured state to a state in which the secondary line can translate along the primary line.

20 Claims, 15 Drawing Sheets

(51) Int. Cl.

| | |
|---|---|
| *B63B 21/08* | (2006.01) |
| *B63B 21/20* | (2006.01) |
| *B65H 69/04* | (2006.01) |
| *F16G 11/02* | (2006.01) |
| *F16G 11/14* | (2006.01) |

(56) References Cited

U.S. PATENT DOCUMENTS

| | | | |
|---|---|---|---|
| 8,997,928 B1 * | 4/2015 | Ellis .................... | A62B 35/005 |
| | | | 182/36 |
| 9,744,383 B2 * | 8/2017 | Antonio ................... | A62B 1/20 |
| 9,764,177 B2 | 9/2017 | Baudhuin et al. | |
| 10,730,535 B2 | 8/2020 | Hackett | |
| 10,941,835 B2 * | 3/2021 | Marchant ................ | F16G 11/14 |
| 12,459,604 B1 * | 11/2025 | Bedsted .................. | B63B 21/20 |
| 2006/0207828 A1 * | 9/2006 | D'Acquisto ........... | A62B 35/04 |
| | | | 182/3 |
| 2010/0051381 A1 * | 3/2010 | Wydner ................. | A62B 35/04 |
| | | | 182/5 |

\* cited by examiner

1104

1200

1102

1000

1202 see FIG. 7B 1300 1100

1400

1200

1310

1100

1300

ADJUSTABLE TETHER LINE SYSTEMS AND SECUREMENT METHODS

CROSS REFERENCE TO RELATED APPLICATIONS

This application is a continuation-in-part of U.S. patent application Ser. No. 19/273,520, filed Jul. 18, 2025, now U.S. Pat. No. 12,459,604.

TECHNICAL FIELD

Embodiments of the present disclosure relate generally to tethering systems and methods, and more particularly to adjustable tethering systems configured to provide controlled tensioning and releasable locking along a primary line. In various embodiments, the systems utilize structural principles akin to those found in friction hitch knots, such as the Prusik knot, to create adjustable, self-tightening securement. The tethering systems of the present disclosure are particularly well-suited for non-life-critical applications where adaptability, ease of use, and mechanical reliability are prioritized. Example use cases include marine tethering (e.g., dock lines and fender lines), recreational rigging, and general utility tie-downs, though the systems may be adapted for use across a wide range of environments.

BACKGROUND

Tethering mechanisms are frequently used to secure objects to fixed structures in dynamic environments. In marine contexts, dock lines are used for securing watercraft to docks, piers, and similar structures, while fender lines are used to suspend protective equipment, such as fenders, from the watercraft.

Mooring features, such as cleats, are typically robust fittings located at predetermined permanent or semi-permanent positions and are designed to withstand substantial loads, even in the presence of wind, tide, or current. These features enable secure attachment of lines, such as dock lines, often through the use of knots or hitches.

Docking and mooring conditions can vary widely due to differences in vessel geometry, dock configuration, and water level. Conventional systems rely on static mooring features and user-tied knots or hitches—methods that can be unreliable, time-consuming, or dependent on user skill, especially when wind, wave, or current conditions complicate the scenario.

Many vessels lack optimally located mooring features for every securement situation. Operators often resort to using non-mooring features, such as railings or stanchions, which are not designed to bear significant loads. This can result in insecure attachments, damage to vessel features, or inadequate protection from devices like fenders.

These limitations can produce unsafe, unreliable, or unworkable docking or mooring outcomes, adding stress and complexity for vessel operators. Accordingly, there is a need for a securement system that offers enhanced versatility, ease of attachment, and adjustability across diverse conditions.

Adjustable tethering systems and knots that emphasize irreversible locking under load are well known in safety-critical applications. However, these designs are inherently unsuitable for systems requiring quick adjustment or deliberate release while being under a load. Introducing user-accessible release mechanisms into such systems would compromise their safety function. In contrast, applications outside the domain of human safety present an opportunity for systems that permit intentional, controlled release while under a load to improve usability and efficiency.

The present disclosure addresses this need by providing a mechanically integrated tethering system comprising a capsule that houses a secondary line wound about a primary line. The capsule includes a bail release feature that can be selectively engaged—while the system is under load—to release tension in the secondary line. The system thus provides reversible locking and controlled release, thereby enabling secure, adjustable tethering in non-safety-critical environments without relying on knots or skilled knowledge.

In some embodiments, the system includes looped ends to facilitate easy and intuitive attachment without tying knots, while enabling users to adjust the effective length of the tether line—and therefore the effective distance between the looped ends—without detaching it, enhancing both speed and ease of use.

For the purposes of this disclosure, references to dock lines, fender lines, or the like are not intended to be limiting. These terms may be used interchangeably and should be interpreted broadly.

Additionally, the terms securement feature, mooring feature, non-mooring feature, and fixture are used interchangeably and are to be interpreted broadly. The same applies to the terms mooring, docking, and tie-up, as well as protection means, like fender, bumper, boat fender, and boat bumper.

SUMMARY

According to some aspects of the disclosure, an adjustable tethering system is provided that includes a primary line having a longitudinal length and a secondary line defining a bail section and an attachment section. The bail section of the secondary line is wound about the primary line in a first winding direction such that the secondary line further defines a plurality of windings, with the bail section extending transversely across the plurality of windings. The secondary line is releasably slidable along the longitudinal length of the primary line. The system further includes a graspable bail release feature that, when manipulated to cause the bail section to translate in a direction opposite the winding direction, reduces a constriction of the plurality of windings about the primary line.

In some embodiments, the graspable bail release feature is wrapped around the bail section and includes a free end that extends outwardly. In other embodiments, the bail release feature is permanently affixed to the bail section, for example, as a tab sewn to the secondary line. The system may include a capsule with an internal cavity in which the plurality of windings are positioned, wherein the attachment section extends outwardly beyond the exterior of the capsule.

The adjustable tethering system may be configured for marine applications, including securing a watercraft during docking or mooring. In certain embodiments, the secondary line is wrapped around the primary line to form a frictional knot, such as a Prusik or Klemheist knot.

Additional embodiments provide a system wherein the secondary line is wrapped about the primary line to form a plurality of windings, an attachment section, and a bail section that extends transversely across the windings. A tensile force applied to the attachment section causes constriction of the windings about the primary line to arrest translation of the secondary line. A graspable bail release feature may be manipulated to reduce the constriction and enable translation along the primary line.

Also disclosed is a method of manufacturing such a tethering system. The method includes providing a primary line, winding a secondary line about the primary line in a first winding direction to form a plurality of windings and a bail section, and coupling a graspable bail release feature to the secondary line. The bail release feature, when manipulated to cause the bail section to translate in a direction opposite the winding direction, reduces a constriction of the windings about the primary line. The method may also include providing a capsule and positioning the windings within an internal cavity of the capsule. The bail release feature may be coupled to the bail section by wrapping or permanent affixation.

Figure 1A:
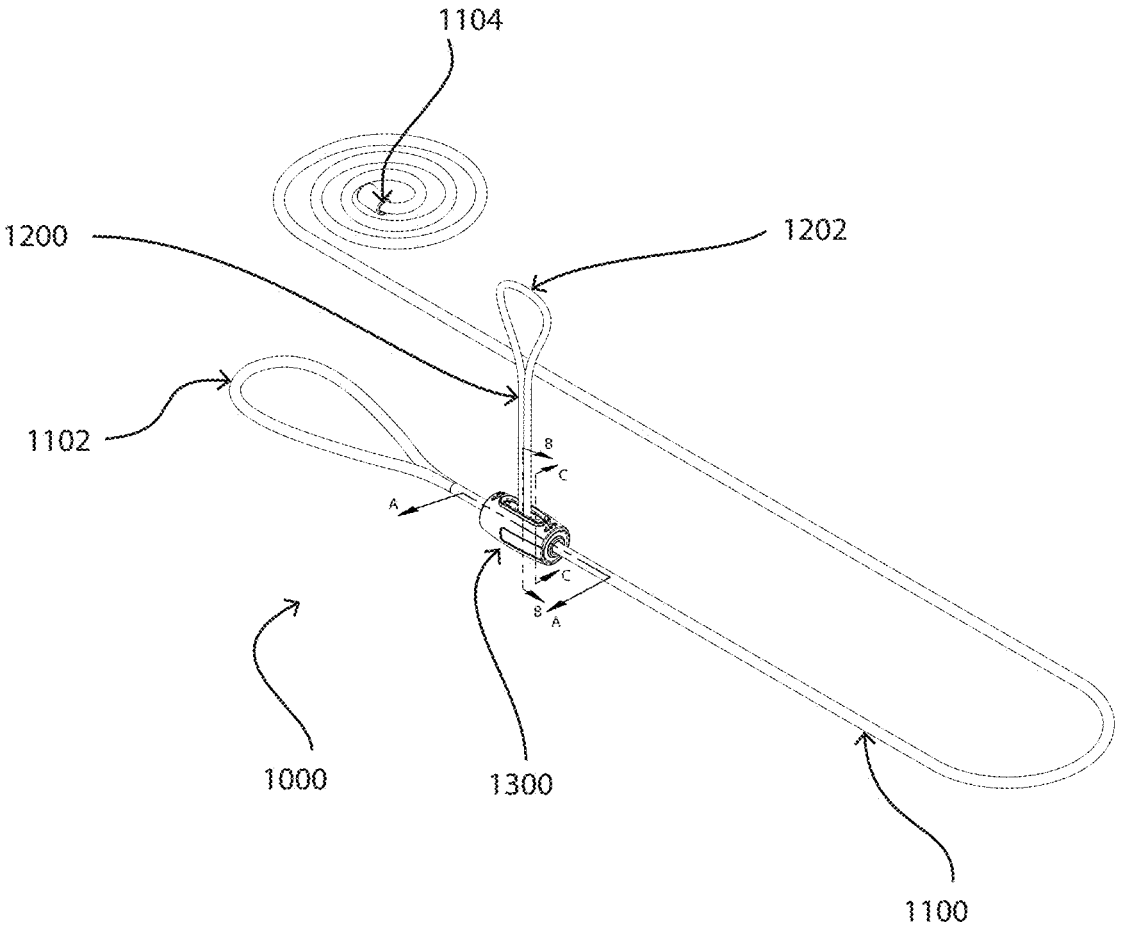
FIG. 1A illustrates a perspective view of an adjustable tethering system in a first configuration according to certain embodiments.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1B:
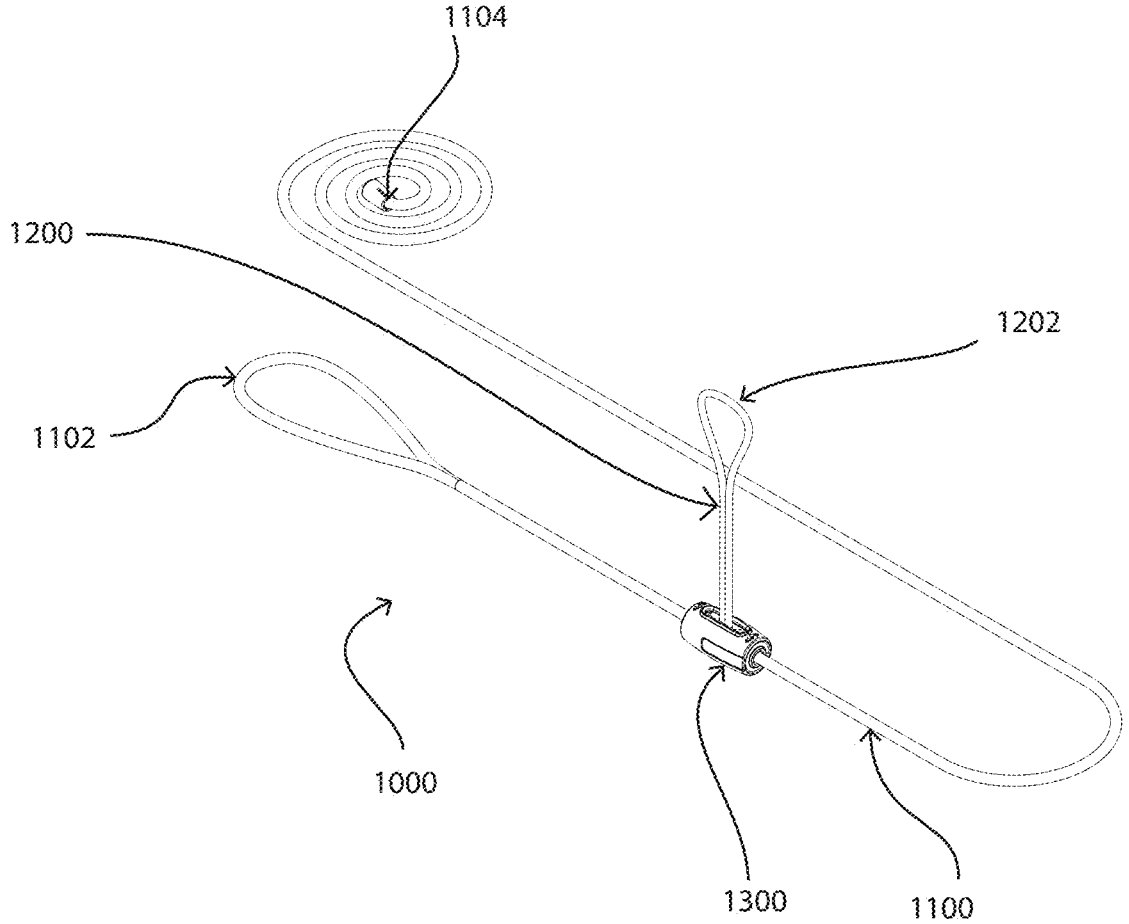
FIG. 1B illustrates a perspective view of the adjustable tethering system in a second configuration according to certain embodiments.
Figures 2A, 2B:
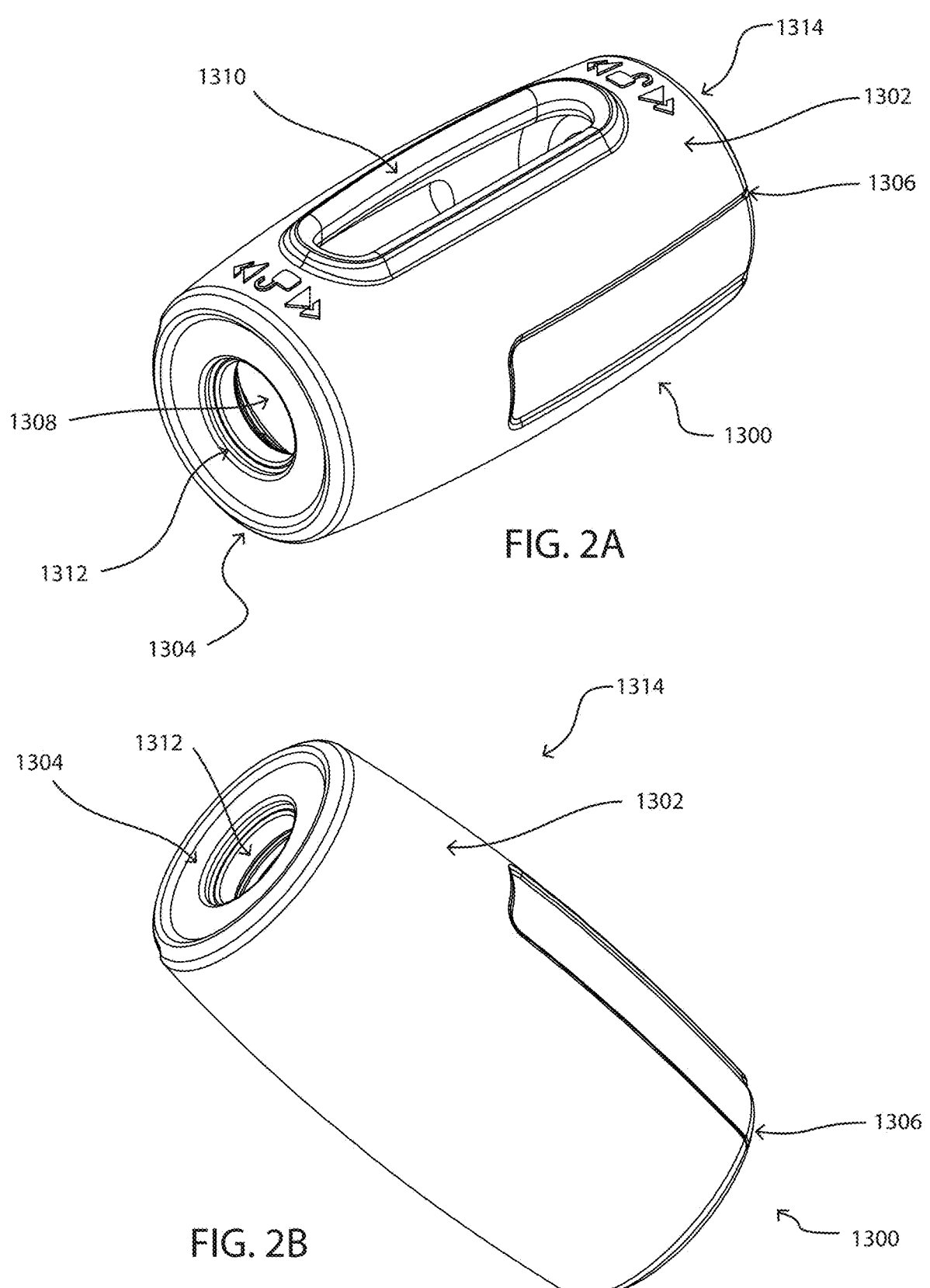
FIG. 2A illustrates a front perspective view of a capsule according to certain embodiments.
FIG. 2B illustrates a bottom perspective view of the capsule according to certain embodiments.
Figure 2C:
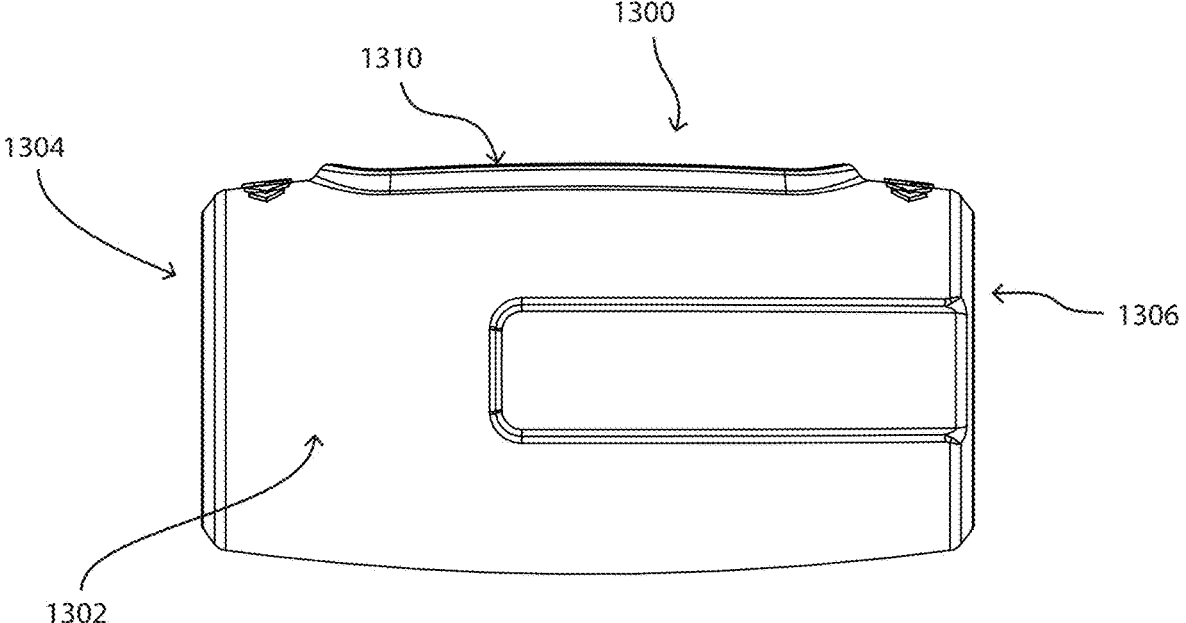
FIG. 2C illustrates a front view of the capsule according to certain embodiments.
Figure 2D:
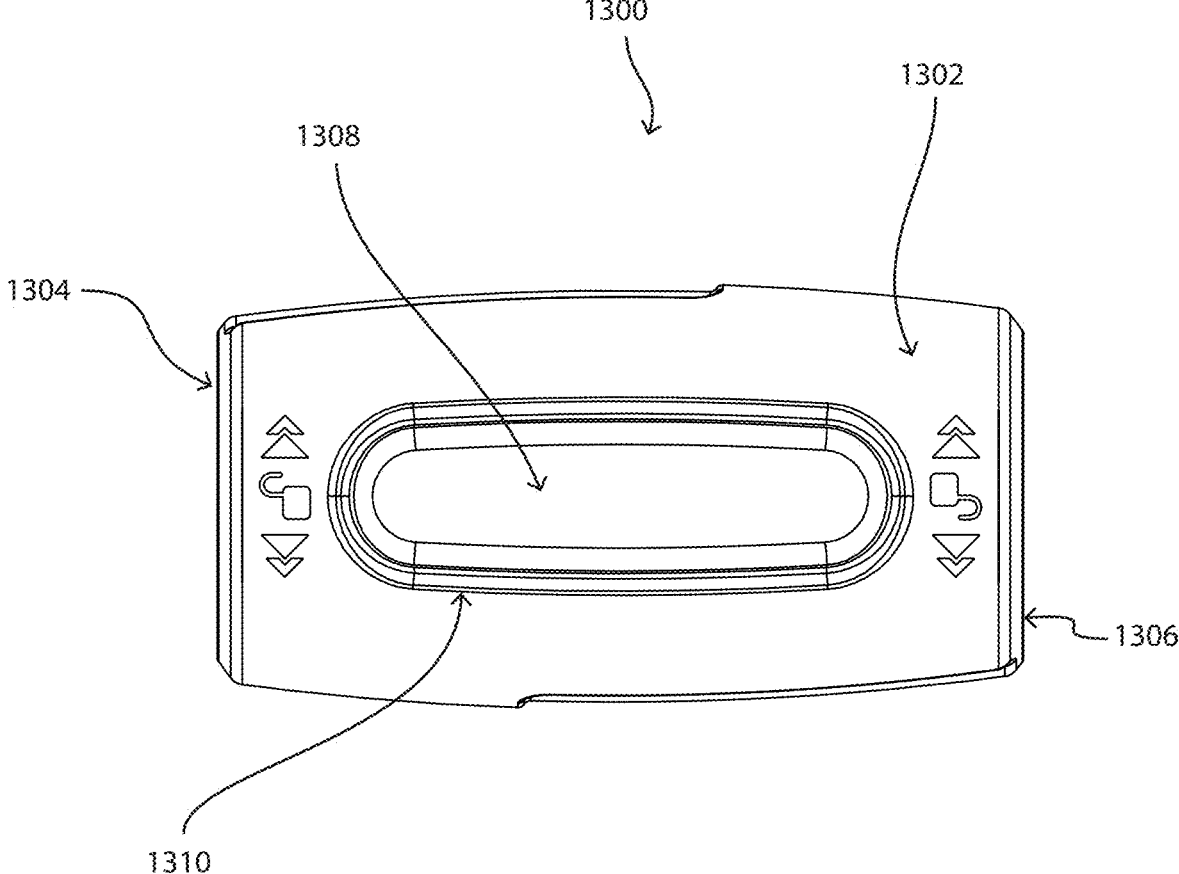
FIG. 2D illustrates a top view of the capsule according to certain embodiments.
Figure 2E:
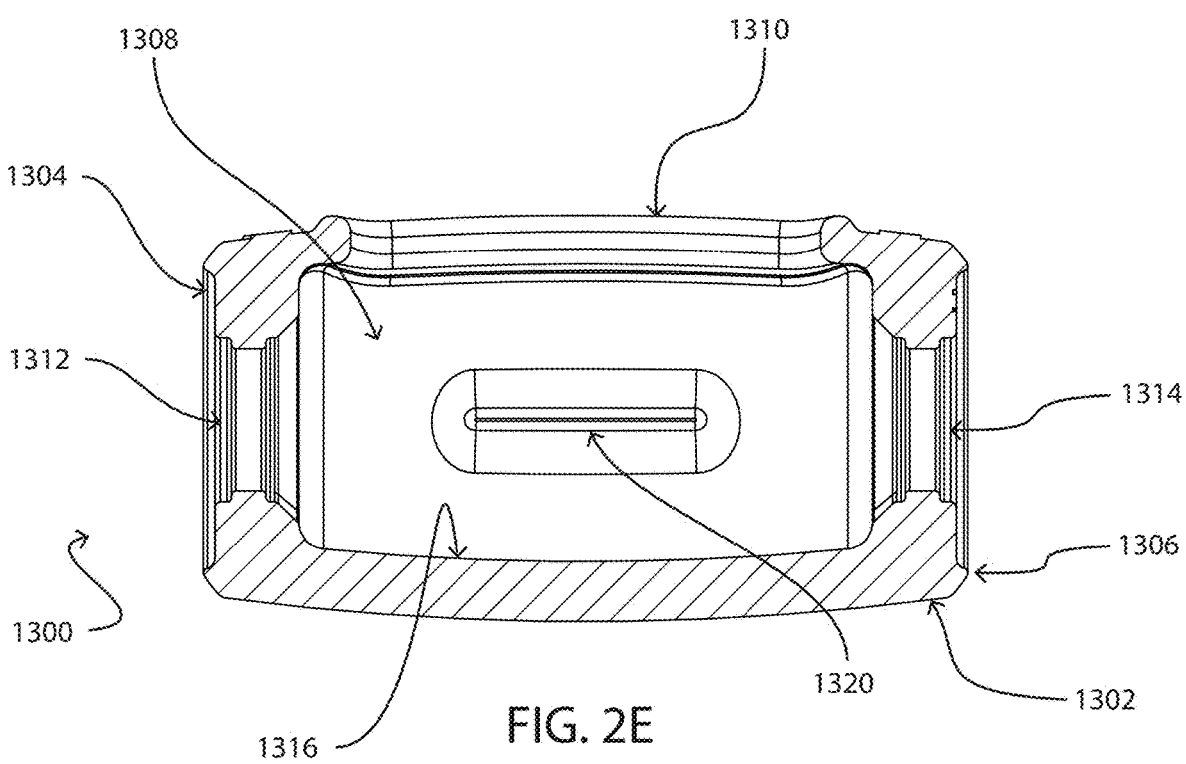
FIG. 2E illustrates a side cross-sectional view of the capsule taken along its longitudinal axis according to certain embodiments.
Figure 2F:
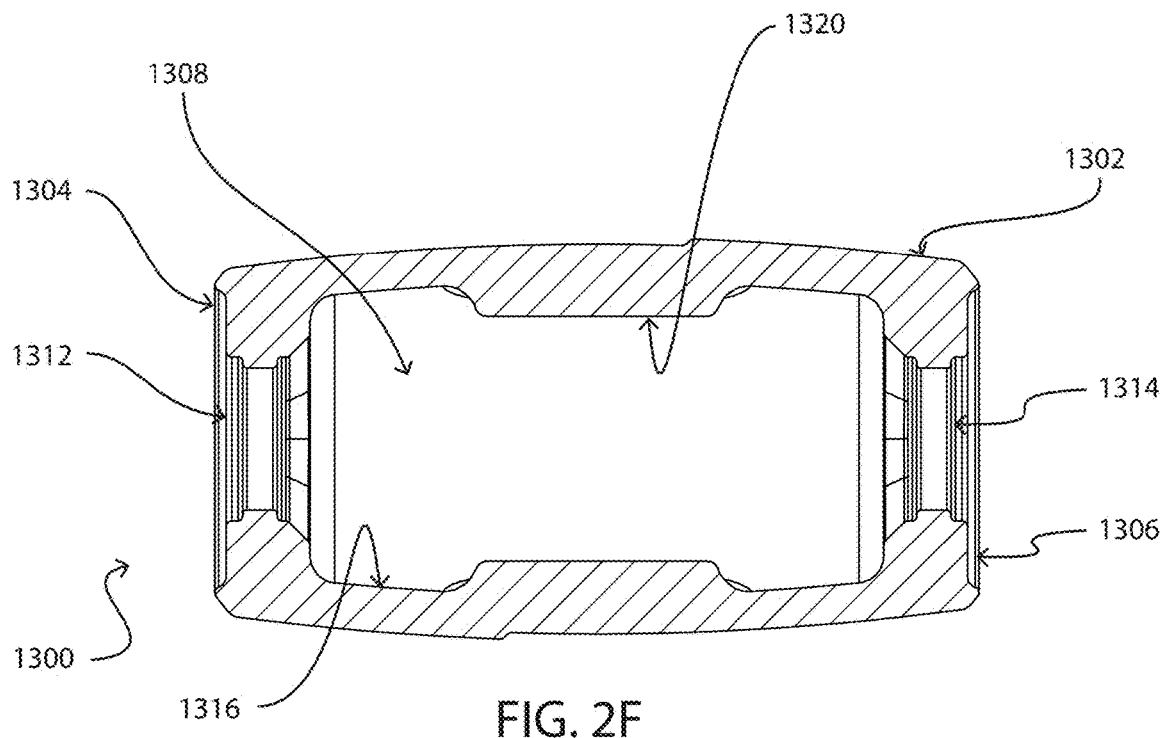
FIG. 2F illustrates a top cross-sectional view of the capsule according to certain embodiments.
Figure 2G:
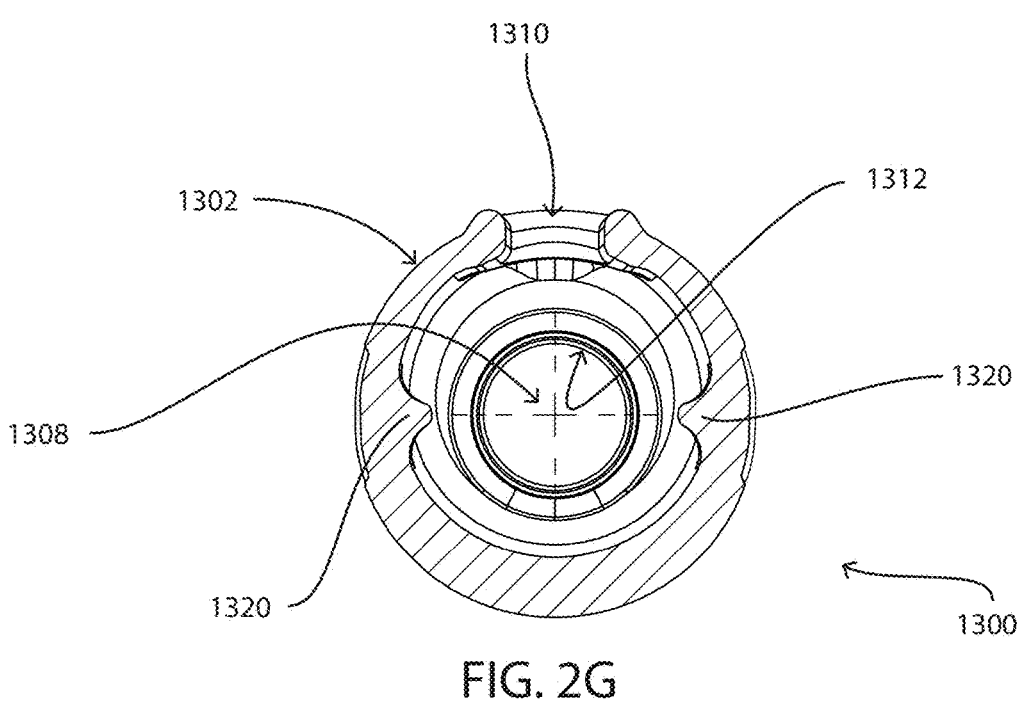
FIG. 2G illustrates a cross-sectional view of the capsule taken across its longitudinal axis according to certain embodiments.
Figure 2H:
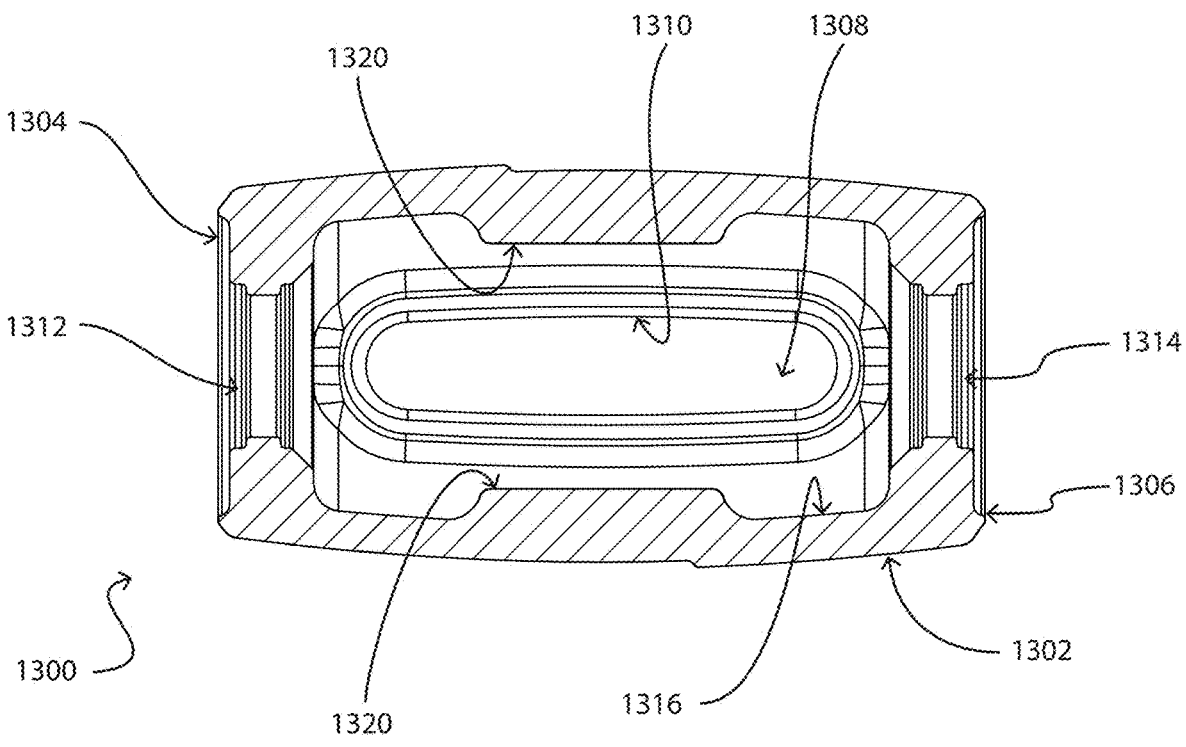
FIG. 2H illustrates a bottom cross-sectional view of the capsule according to certain embodiments.

Embodiments of the present disclosure relate generally to adjustable tethering systems that can be selectively secured or repositioned along a primary support line. FIGS. 1A and 1B illustrate a tethering system 1000. The tethering system 1000 includes a primary line 1100, a secondary line 1200, and a capsule 1300.

The primary line 1100 includes a first end 1102 and a second end 1104 and a longitudinal length therebetween. As shown in FIG. 1A, the first end 1102 is a looped end. While shown as a non-looped end in FIG. 1A, it should be appreciated that second end 1104 may be in the form of a looped end.

In various embodiments, the primary line 1100 is composed of a polymeric material set selected for its tensile strength, flexibility, abrasion resistance, and environmental durability—qualities appreciated in marine, climbing/rescue, and load-transportation contexts. Such polymeric materials may include, without limitation, polyurethane-coated nylon, polyester, ultra-high-molecular-weight polyethylene (UHMWPE; e.g., Dyneema®), polypropylene, or other engineered polymers. The primary line 1100 may vary in construction, braid density, or diameter, depending on desired load capacity and frictional engagement characteristics. Those skilled in the art will appreciate that the specific material selection and construction may be tailored to the intended application and performance requirements.

Figure 3:
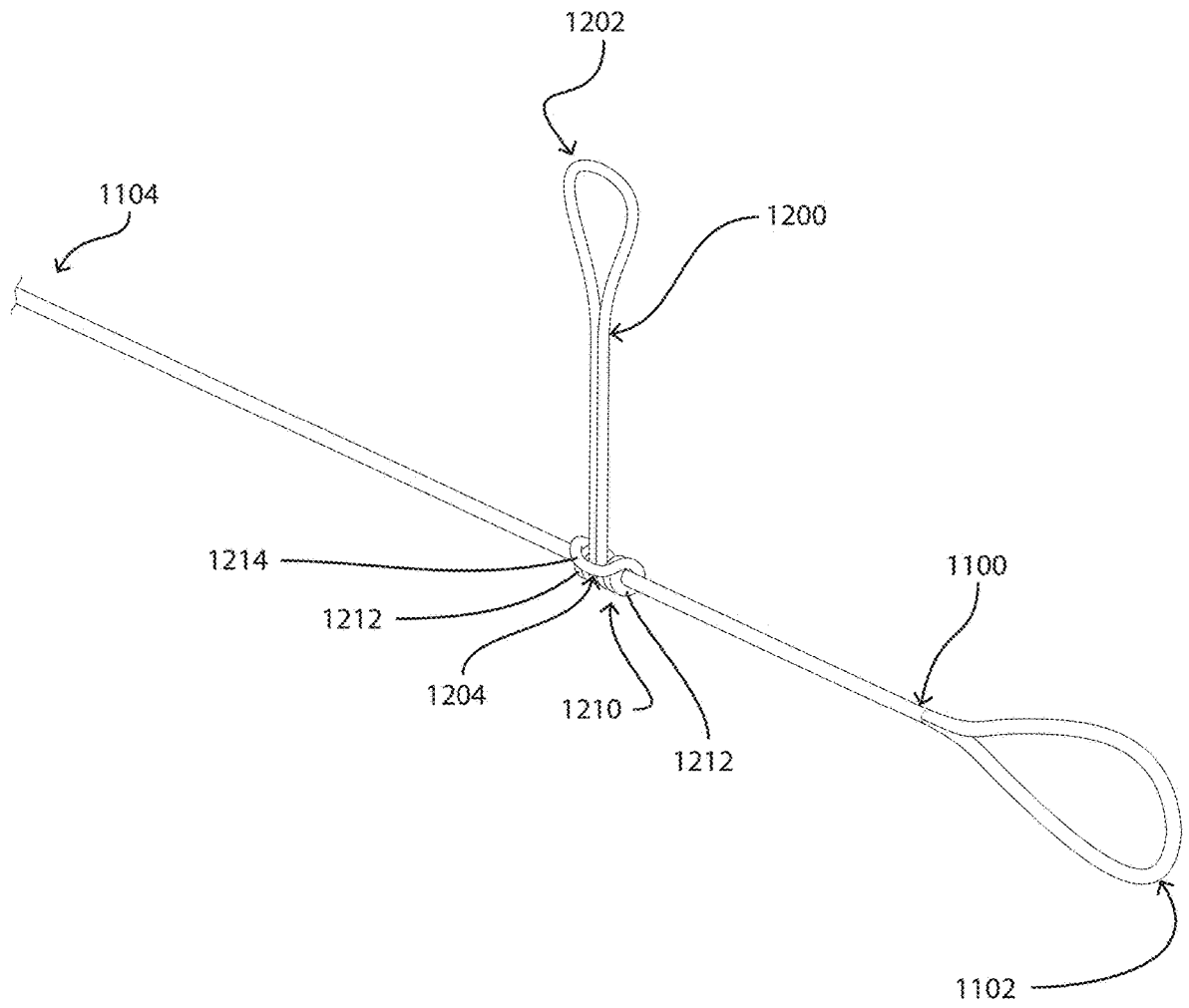
FIG. 3 illustrates perspective view of the secondary line wound about a primary line to form a locking section, with the capsule removed for clarity, according to certain embodiments.

The secondary line 1200 includes a first end 1202 and a second end 1204 (obscured from view in FIG. 1A, but shown in FIG. 3). In various embodiments, the first end 1202 is a free end that extends from the capsule 1300. In various embodiments, the system 1000 is configured such that the second end 1204 is positioned within an interior of the capsule 1300. The first end 1202 may be configured as a looped end, or alternatively, as a pair of free ends, depending on application requirements. As shown in FIG. 3, the secondary line 1200 is wound about the primary line 1100 and operates to secure or permit translation of the capsule 1300 (not shown in FIG. 3) depending on how tension is applied to the system 1000.

In various embodiments, the secondary line 1200 is likewise formed from a polymeric material set such as polyurethane-coated nylon, though alternatives like polyester, UHMWPE, polypropylene, braided aramid blends, or similar engineered polymers are equally applicable. The secondary line may also vary in construction, braid density, or diameter, depending on desired load capacity and frictional engagement characteristics. These descriptions are non-limiting, and those skilled in the art will understand that other polymeric configurations may be substituted to achieve desired results.

As shown in a comparison of FIGS. 1A and 1B, the distance between the primary line looped end 1102 and the secondary line looped end 1202 can be adjusted by translating the secondary line 1200 and the capsule 1300 along the longitudinal axis of the primary line 1100. For instance, FIG. 1A shows the tethering system 1000 with the secondary line looped end 1202 positioned along the primary line 1100 a first distance from the primary line looped end 1102. Conversely, FIG. 1B shows the tethering system 1000 with the secondary line looped end 1202 positioned along the primary line 1100 a second distance from the primary line looped end 1102, where the second distance is a greater distance than the first distance.

Turning now to FIGS. 2A through 2H, various views of the capsule 1300 are shown. In the illustrated embodiment, the capsule 1300 is generally cylindrical, although this shape is nonlimiting and other geometries are contemplated. The capsule 1300 includes an exterior surface 1302, a first end 1304, and a second end 1306. Although obscured from view in FIGS. 2A through 2D, the capsule 1300 defines an interior cavity 1308 bounded at least in part by an interior surface 1316 (see, e.g., FIGS. 2E through 2H). The capsule 1300 also includes a through-hole 1310 that is sized and shaped to accommodate the secondary line 1200 passing through it. In the illustrated embodiment, the through-hole 1310 is configured as a longitudinal slot formed along the exterior surface 1302.

The through-hole 1310 permits the free end 1202 of the secondary line 1200 to extend from the interior cavity 1308 to the exterior of the capsule 1300, thereby allowing access to the free end 1202 for operational use of the system 1000 (e.g., for looping around a cleat, pole, or other mooring feature). In various embodiments, the through-hole 1310 is oversized relative to the portion of the secondary line 1200 passing through it. Stated differently, the through-hole 1310 is sized and shaped to permit relative movement between the secondary line 1200 and the capsule 1300. In the illustrated embodiment, the through-hole 1310 is a longitudinal slot having a length along its major axis—major axis length—and a length along its minor axis—minor axis length. The major axis length in this embodiment exceeds the combined diameters of the two segments of the secondary line 1200 extending through the through-hole 1310, and is at least half the length of the minor axis. It is to be appreciated, however, that the major and minor axis lengths may be equal, provided that the total area of the through-hole 1310 exceeds the cross-sectional area of the portion of the secondary line 1200 passing therethrough.

With specific reference now to FIGS. 2E through 2H, in various embodiments, the capsule 1300 includes a bail release feature 1320 that is operable to facilitate selective displacement of the bail section 1214 of the secondary line 1200 positioned within the internal cavity 1308 of the capsule. In some embodiments, the bail release feature 1320 takes the form of a protrusion extending inwardly from the interior wall 1316 of the capsule 1300. As illustrated, the bail release feature 1320 is positioned within the interior cavity 1308 such that, when the system 1000 is assembled, the radial distance between the bail release feature 1320 and the central axis of the primary line 1100 is less than the radial distance between the bail section 1214 and the central axis of the primary line 1100. This relative positioning ensures a mechanical interference between the bail release feature 1320 and the bail section 1214 during use. Stated differently, as the capsule 1300 is rotated, or otherwise manipulated by a user, the bail release feature 1320 engages and displaces the bail section 1214 in a manner that enables a release of tension in the windings 1212, thereby transitioning the system 1000 from the constrained state to the free state. In some embodiments, the bail release feature 1320 spans the entire longitudinal length of the interior cavity 1308 (i.e., from one end of the capsule to the other), while in other embodiments, like that illustrated in FIGS. 2E through 2H, the bail release feature 1320 extends only partially along the longitudinal axis of the cavity. The shape of the bail release feature 1320 is nonlimiting and may include a linear ridge, angled ramp, or contoured rib, among other geometries, provided it is operable to physically interact with and displace the bail section 1214 to facilitate release of the windings 1212 from the primary line 1100.

In various embodiments, the interior geometry of the capsule 1300 generally conforms to its external geometry. For instance, in embodiments where the capsule 1300 is generally cylindrical in shape, the interior cavity 1308 may likewise adopt a generally cylindrical profile. The wall thickness of the capsule 1300 need not be uniform. In some embodiments, the wall cross-section varies at different radial or longitudinal positions to achieve localized performance characteristics. For example, the capsule 1300 may include thicker wall sections at its longitudinal termini (e.g., near the first end 1304 and the second end 1306) to enhance structural stiffness and provide added resistance to deformation or collapse—particularly in configurations where the capsule is soft or otherwise exhibits a low stiffness. Additionally, or alternatively, the wall thickness may vary circumferentially. In one embodiment, a band of differential thickness extends from approximately the three (3) o'clock to nine (9) o'clock positions relative to the capsule's central axis (with reference to a transverse cross-section), while the regions between the one (1) and three (3) o'clock, and the nine (9) o'clock and eleven (11) o'clock positions are comparatively thinner. This configuration can preserve overall compliance and tactile responsiveness of the capsule body while ensuring that the capsule maintains sufficient torsional stiffness to be manually rotated about the primary line 1100 without excessive deformation. Such localized stiffening provides mechanical feedback and improved control to the user during actuation of the bail release mechanism, particularly in soft capsule embodiments where rotational compliance may otherwise inhibit effective manipulation. Those of skill in the art will appreciate that the specific internal and external geometries—and their relationship—may be tuned for a given material set to balance user experience, manufacturability, and functional performance.

With respect to material selection, the capsule 1300 may be constructed from a wide range of materials depending on the mechanical, environmental, and tactile performance desired for a given application. In some embodiments, the capsule 1300 is formed from a soft polymeric material—such as silicone, thermoplastic elastomers (TPE), or thermoplastic polyurethane (TPU)—having a Shore A hardness ranging from approximately 30 A to 60 A. Such configurations provide a compliant and grippable interface for the user, while still affording the structural integrity needed to house the locking section 1210. In other embodiments, the capsule 1300 is formed from harder polymeric materials—such as polycarbonate, acetal, or glass-filled nylon—which may provide increased dimensional stability and wear resistance. Regardless of material hardness, the selected material set is generally UV resistant—either inherently or via integrated stabilizers—to ensure long-term durability in outdoor settings. Moreover, those of skill in the art will appreciate that the capsule 1300 may be tailored for marine, climbing, and load-transportation contexts using suitable polymers with appropriate moisture, salt, and abrasion resistance characteristics. The materials described herein are nonlimiting, and it is to be understood that any polymeric material compatible with the described functional requirements may be employed.

In various embodiments, the bail release feature 1320 is monolithically formed with the capsule 1300, such that it is integrally molded or machined from the same material stock as the remainder of the capsule body. This integration provides manufacturing efficiency and structural continuity. However, in other embodiments, the bail release feature 1320 is a discrete component that is insertable into, or otherwise affixable within the internal cavity 1308 of the capsule 1300. In such modular configurations, the bail release feature 1320 may be selectively positioned or oriented during assembly, allowing for tuning of the engagement profile between the bail release feature 1320 and the bail section 1214. This modularity may also enable use of differing material sets for the capsule body and the bail release feature 1320—permitting, for instance, a harder or lower-friction material for the capsule exterior while using a higher-friction or more resilient material for the bail release feature 1320 to optimize performance at the contact interface with the bail section 1214.

With respect to material selection, the bail release feature 1320 may be fabricated from a variety of materials depending on desired interaction characteristics. In some embodiments, the bail release feature 1320 is formed from a soft or elastically deformable material—such as a thermoplastic elastomer (TPE) (e.g., Shore 40 A to 60 A)—to provide compliance and mitigate wear on the bail section 1214. In other embodiments, the bail release feature 1320 is formed from a harder polymer (e.g., nylon, polycarbonate, or acetal) or a metal insert, providing dimensional precision and reliable contact geometry over extended use cycles. Additionally or alternatively, the bail release feature 1320 may include surface treatments or texturing—such as microridges, abrasive coatings, or high-friction overlays—to enhance mechanical engagement with the bail section 1214 and reduce the risk of slip or incomplete disengagement.

In terms of geometry, the bail release feature 1320 may adopt a variety of orientations and shapes within the internal cavity 1308. While a transverse or radially protruding bar configuration is illustrated in the exemplary embodiment, alternative embodiments may include axially extending ridges, curved protrusions, wedge-like fins, or spring-loaded paddles. In certain configurations, the bail release feature 1320 may be resiliently biased (e.g., via an internal spring or flexural hinge) toward the primary line axis 1100 such that it dynamically adjusts its position during capsule rotation to ensure consistent engagement with the bail section 1214. In other embodiments, the bail release feature 1320 may be angularly offset to achieve preferential engagement based on the handedness of the winding (i.e., optimized for clockwise or counterclockwise rotations).

In still further embodiments, the bail release feature 1320 may be configured for post-manufacturing adjustment within the capsule 1300. For example, the feature may be retained in a slot, track, or keyed interface within the interior wall 1316 of the capsule 1300, permitting its position to be shifted inward or outward relative to the primary line axis 1100. This adjustability enables fine-tuning of the engagement geometry to accommodate variations in line diameter, knot tightness, or use-case demands.

In general operation, the tethering system 1000 is configured such that the capsule 1300 and the secondary line 1200 are configured to both 1) selectively bidirectionally translate along a longitudinal axis of the primary line 1100, and 2) be constrained against translation along that same axis. Accordingly, the tethering system 1000 operates in two distinct states: a "constrained state" and a "free state." In the free state, the capsule 1300 and the secondary line 1200 are translatable along the longitudinal length of the primary line 1100. In the constrained state, the capsule 1300 and the secondary line 1200 are restricted from translating along the longitudinal length of the primary line 1100.

The constrained state is generally characterized by frictional engagement between the secondary line 1200 and the primary line 1100 with sufficient force to prevent or otherwise restrict translation of the capsule 1300 and secondary line 1200 along the primary line 1100. For instance, if sufficient tensile force is applied to the secondary line 1200—such as during loading—the secondary line 1200 constricts about the primary line 1100 and forms a frictional lock that inhibits movement along the longitudinal axis of the primary line 1100.

Conversely, the free state is generally characterized by frictional engagement between the secondary line 1200 and the primary line 1100 that is insufficient to prevent or otherwise restrict translation of the capsule 1300 and secondary line 1200 along the primary line 1100. For example, when tension in the secondary line 1200 is reduced or eliminated—such as by user actuation of the capsule 1300 to release the constricting portion of the secondary line 1200—the secondary line 1200 relaxes around the primary line 1100. This relaxation reduces friction, allowing the capsule 1300 and the secondary line 1200 to translate along the longitudinal length of the primary line 1100. In such conditions, a force applied to the capsule 1300 (and thereby to the portion of the secondary line 1200 interior to the capsule 1300) in the longitudinal direction of the primary line 1100 causes the secondary line 1200 and the capsule 1300 to translate along the primary line 1100.

In various embodiments, the system 1000 is transitioned from the free state to the constrained state via an application of force to the free end 1202 of the secondary line 1200. In various embodiments, the system 1000 can be transitioned from the constrained state to the free state via a user-actuated release mechanism—like a bail release mechanism—as discussed further below. This dual functionality of the tethering system 1000 is achieved through the geometry and frictional interaction of the secondary line 1200 and the primary line 1100, as influenced by the internal configuration of the capsule 1300. Thus, the system 1000 provides users with a controllable tethering mechanism that transitions between fixed and adjustable configurations depending on the nature and direction of applied forces.

With reference to FIG. 3, an arrangement of the primary line 1100 and the secondary line 1200 is shown, with the capsule 1300 removed for illustrative clarity. As depicted, the secondary line 1200 is wrapped around the primary line 1100 multiple times and passed through itself to form a locking section 1210. In various embodiments, the locking section 1210 includes a plurality of windings 1212 and a bail section 1214. The windings 1212 are formed as the secondary line 1200 is looped about the primary line 1100 in close succession, with each successive winding positioned longitudinally interior to the previous winding, such that the earliest windings lie farther from the longitudinal center of the locking section 1210 than the subsequent ones. These successive windings form a barrel or hollow interior to the windings through which the primary line 1100 passes. In some embodiments, the second end 1204 of the secondary line 1200 extends across the windings 1212 to form the bail section 1214, such that the windings pass between the bail section 1214 and the primary line 1100. As shown in FIG. 3, the first end 1202 of the secondary line 1200—referred to as the free end—extends from the windings 1212, underneath the bail section 1214 (i.e., between the bail section 1214 and the primary line 1100), and then outward away from the primary line 1100.

Figure 4A:
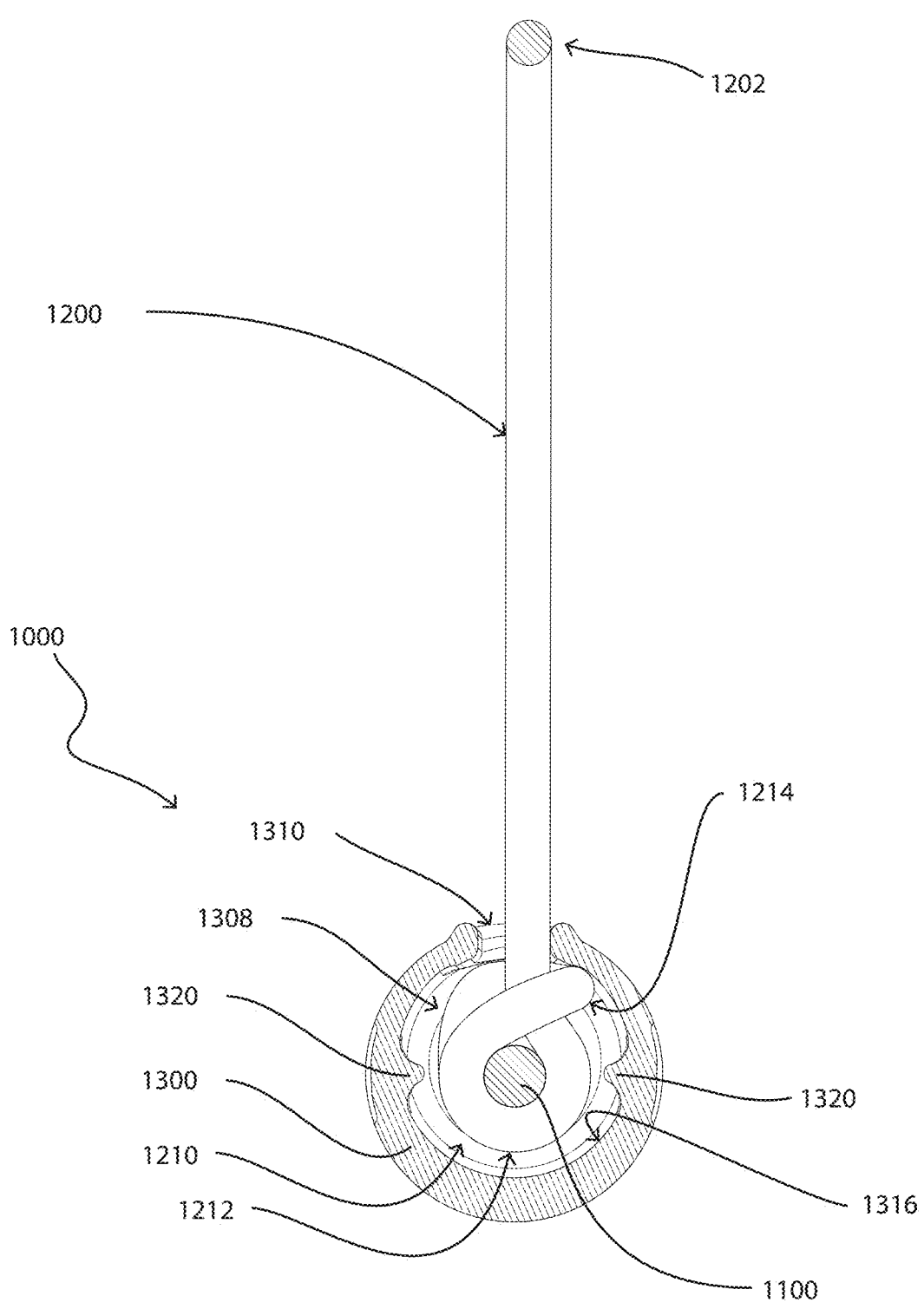
FIG. 4A illustrates a cross-sectional view of the tethering system in a constrained state taken along line B-B of FIG. 1A according to certain embodiments.
Figure 4B:
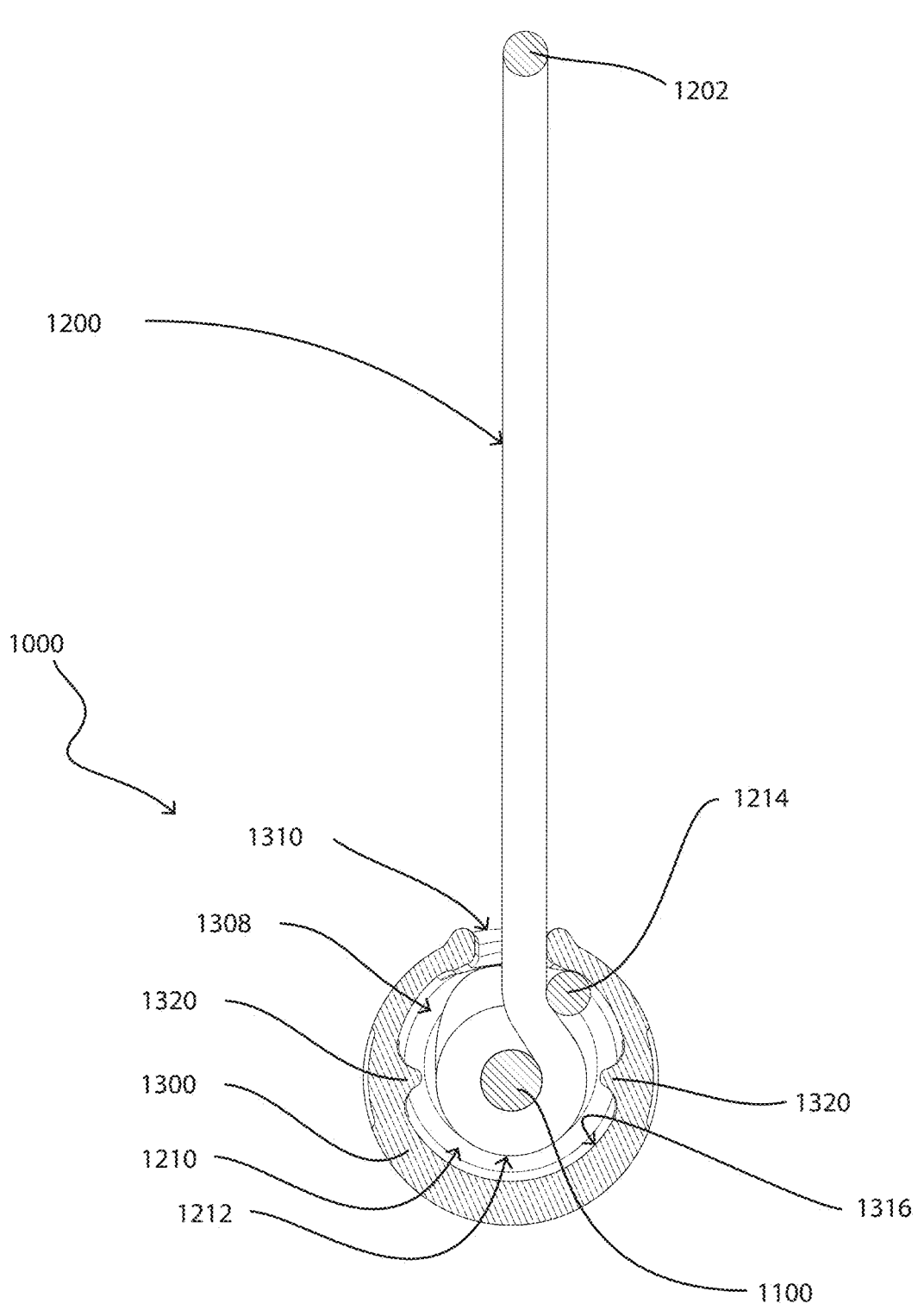
FIG. 4B illustrates a cross-sectional view of the tethering system in a constrained state taken along line C-C of FIG. 1A according to certain embodiments.
Figure 5A:
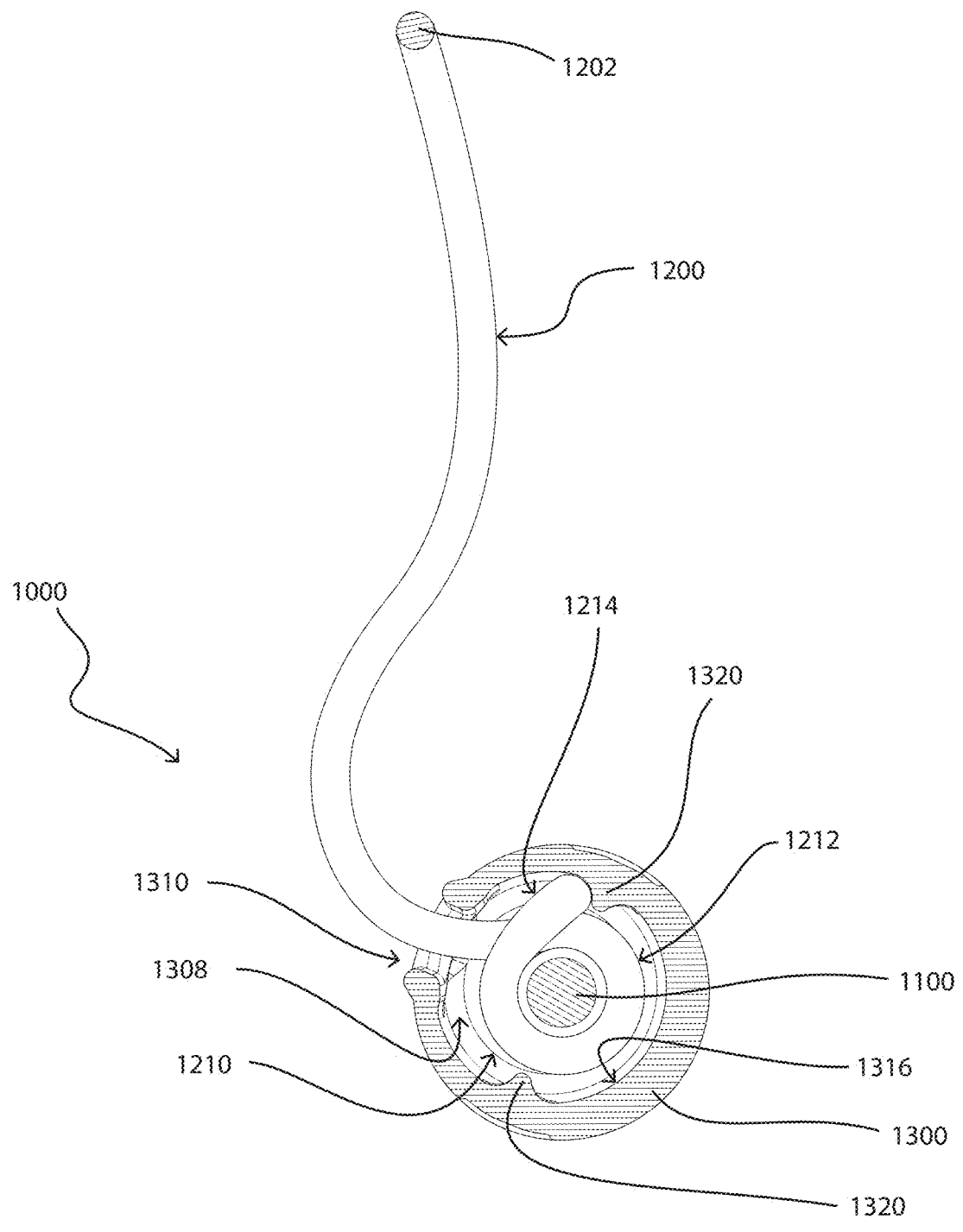
FIG. 5A illustrates a cross-sectional view of the tethering system in a free state taken along line B-B of FIG. 1A according to certain embodiments.
Figure 5B:
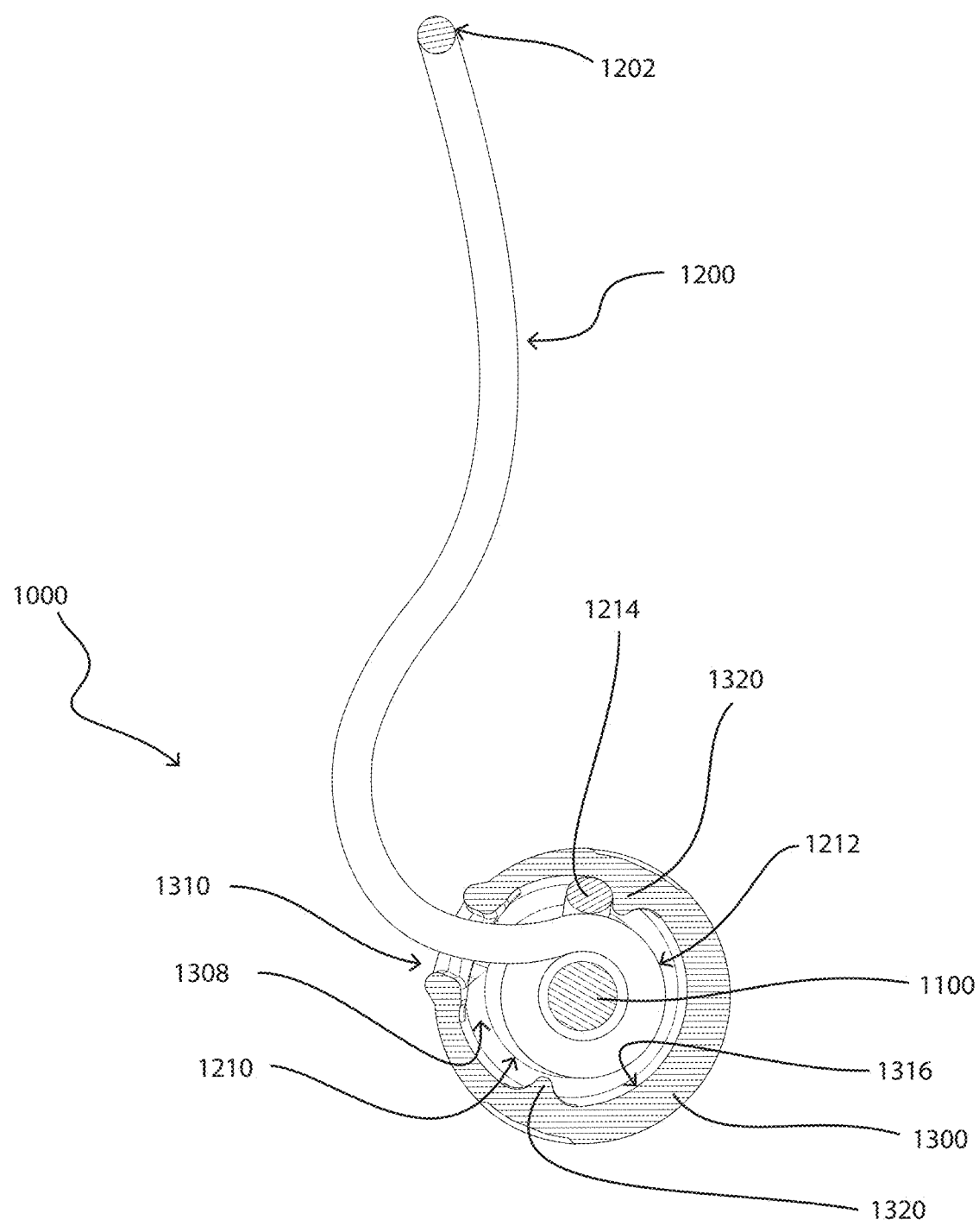
FIG. 5B illustrates a cross-sectional view of the tethering system in a free state taken along line C-C of FIG. 1A according to certain embodiments.

When a force is applied to the free end 1202 to place the secondary line 1200 in tension, the bail section 1214 functions as a mechanical constraint that prevents the windings 1212 from unwinding or relaxing around the primary line 1100. FIGS. 4A and 4B illustrate the system 1000 taken along line B-B and line C-C, respectively, of FIG. 1A, with the system 1000 in the constrained state. FIGS. 5A and 5B also illustrate the system 1000 taken along line B-B and line C-C, respectively, of FIG. 1A, but with the system 1000 in the free state.

The cross-sectional view of FIG. 4A is taken longitudinally outwardly of the outermost winding of the bail section 1214 of the locking section 1210, showing the locking section 1210, including the windings 1212 and bail section 1214 positioned within the internal cavity 1308 of the capsule 1300. FIG. 4A also illustrates how the windings 1212 constrict about the primary line 1100, and how the free end 1202 extends from beneath the bail section 1214 and through the through-hole 1310 to the exterior of the capsule 1300. Additionally illustrated is how the secondary line 1200 in the locking section 1210 transitions from the winding 1212 to the bail section 1214.

The cross-sectional view of FIG. 4B is taken longitudinally inwardly of the outermost winding of the bail section 1214 of the locking section 1210 between successive windings and at the innermost winding, where the secondary line 1200 transitions from the windings to the free end 1202 that extends from the capsule 1300 through the through-hole 1310. As shown, the free end 1202 extends from between the bail section 1214 and the primary line 1100. FIG. 4B shows the bail section 1214 in cross-section view, thereby illustrating how the bail section 1214 traps the windings 1212 and prohibits unwinding of the secondary line 1200 from about the primary line 1100.

As shown, because the free end 1202 extends from between the bail section 1214 and the primary line 1100, any pulling force applied to the free end 1202 is translated into a constrictive force that the windings 1212 exert on the primary line 1100. Specifically, the routing of the free end 1202 beneath the bail section 1214 creates an interference geometry in which the bail section 1214 effectively traps the windings 1212—and the portion of the secondary line 1200 extending therefrom—against the surface of the primary line 1100. As a result, when the secondary line 1200 is placed in tension, the windings 1212 constrict around the primary line 1100, generating a frictional engagement that inhibits longitudinal movement of the locking section 1210—and thereby the capsule 1300—along the primary line 1100. This interaction corresponds to the "constrained state" of the tethering system 1000 described above.

In various embodiments, the constrained state of the tethering system 1000 is comprised of both a "loaded condition" and an "unloaded condition." The loaded condition exists while non-zero tensile force is actively applied to the free end 1202 of the secondary line 1200—such as during operational use when the system is supporting a live load. In marine applications, for example, live loading may occur during wave action while the system 1000 tethers a vessel to a dock. In nonmarine applications, live loading might occur where the system 1000 is used as a tie-down during transport. In live load situations, the applied tension can induce a high degree of constriction in the windings 1212, which results in substantial frictional engagement of the secondary line 1200 with the primary line 1100. In the loaded condition, the amount of force required to translate the capsule 1300 along the primary line 1100—which is a function of the tensile force applied to the free end 1202—can be very high (e.g., greater than 100 pounds-force), making translation of the capsule 1300 and secondary line 1200 along the primary line 1100 impractical or infeasible. The "loaded condition" differs from the "unloaded condition" in that the unloaded condition is the residual state of the system 1000 after the live load is reduced or otherwise eliminated entirely. In this residual state, it is possible for the tension in the windings to be reduced, thereby reducing the constrictive force they exert on the primary line 1100. This, in turn, operates to reduce the amount of force required to translate the capsule 1300 along the primary line 1100.

However, while the force required to translate the capsule 1300 in the unloaded condition of the constrained state may be lower than in the loaded condition, after sufficiently high live loading (e.g., over 400 pounds-force) it may remain undesirably high for practical adjustment (e.g., greater than 20 pounds-force). In instances where the configuration of the system 1000 is such that the constrained state is one in which the amount of force required to translate the capsule 1300 remains undesirably high, releasing the bail section 1214 is required to transition the system 1000 to the free state, where the frictional resistance is sufficiently reduced to enable translation of the capsule 1300 with a minimal amount of force (e.g., below 20 pounds-force).

It is to be appreciated that in the above-discussed embodiments, the constriction of the secondary line 1200 about the primary line 1100 refers to a reduction in the diameter of the windings 1212 that occurs when the secondary line 1200 is placed under tension. In the constrained state, the windings 1212 define a diameter that is smaller than both the diameter of the primary line 1100 and the diameter of the windings 1212 in the free state. The windings 1212 compress the portion of the primary line 1100 passing through the barrel of the windings 1212. This compression creates both physical and frictional interference between the windings 1212 and the primary line 1100, thereby preventing the windings 1212 from translating along the longitudinal axis of the primary line 1100.

In the free state, the windings 1212 define a relaxed diameter that is larger than the diameter of the windings in the constrained state, thereby reducing compression of or constriction about the portion of the primary line 1100 passing through the barrel of the windings 1212. Complete elimination of this compression or constriction is not required to permit translation of the secondary line 1200 and the capsule 1300 along the primary line 1100. Stated differently, frictional engagement between the primary line 1100 and secondary line 1200 need not be eliminated entirely to enable translation of the secondary line 1200 and the capsule 1300 along the primary line 1100. Indeed, some frictional engagement between the primary line 1100 and secondary line 1200 is permissible in the free state and may, under certain conditions, be desirable. A comparison of FIGS. 4A and 4B with FIGS. 5A and 5B shows a relative difference in diameter of the windings 1212, with the diameter of the windings 1212 in FIGS. 5A and 5B exceeding the diameter of the windings 1212 in FIGS. 4A and 4B.

In marine contexts, it is desirable to configure the system 1000 with some frictional engagement in the free state, as such a configuration mitigates unintended translation of the capsule 1300 along the primary line 1100. Specifically, in marine contexts, wave action can cause a dynamic situation that induces motion of the system 1000 (e.g., oscillation due to waves), this motion of the system 1000 can induce "G-Loading", which has the effect of imparting force on the capsule 1300, which, if insufficient frictional engagement exists between the secondary line 1200 and the primary line 1100 in the free state, will tend to cause unintended translation of the capsule 1300 along the primary line 1100 if the system 1000 is in the free state. Generally, in marine contexts, the system 1000 will be in the free state after deployment and until loading is encountered. As such, without sufficient frictional engagement between the secondary line 1200 and the primary line 1100 in the free state, the system 1000 could be at risk of unintentional translation of the capsule 1300 along the primary line 1100 in these marine and other similar contexts.

During testing, as discussed in greater detail below, an agreeable range of input force for translating the secondary line 1200 and capsule 1300 along the primary line 1100 in the free state—particularly in marine applications—was observed to fall between approximately one and fifteen pounds-force (1 lbf-15 lbf). However, it should be appreciated that system 1000 can be configured such that the amount of force required to achieve such translation can vary depending on application-specific requirements. In some use cases, it may be desirable for the tethering system 1000 to allow translation under minimal effort (e.g., less than five pounds-force (pounds-force <5 lbf)), while in other contexts, a moderately low translation threshold (e.g., between five and fifteen pounds-force (5 lbf≤pounds-force≤15 lbf)) may be preferred. In yet other scenarios, a higher force threshold (e.g., greater than fifteen pounds-force (pounds-force >15 lbf)) may be desirable to ensure greater resistance to unintentional movement. Accordingly, selection of a target translation force may be tailored to the operational context, especially in applications where unintentional displacement of the capsule 1300 along the primary line 1100 is unacceptable. In this context of the magnitude of force required to translate the secondary line 1200 and capsule 1300 along the longitudinal length of the primary line, the concept to be appreciated is that in the constrained state, the capsule 1300 and secondary line 1200 are not reasonably translatable along the longitudinal axis of the primary line 1100 due to frictional and physical interference. In contrast, in the free state, translation is achievable with comparatively reduced force.

In some embodiments, translation of the secondary line 1200 and capsule 1300 along the longitudinal length of the primary line 1100 may first require a release of the constriction of the secondary line 1200 about the primary line 1100. For instance, as discussed above, application of a tensile force to the secondary line 1200—such as to its free end 1202—will cause it to constrict around the primary line 1100, thereby placing the tethering system 1000 in the constrained state. In various embodiments, even after removal of the tensile force, the tethering system 1000 will remain in this constrained state. In some embodiments, this residual constrained state is the result of the secondary line second end 1204 interacting with the portion of the secondary line 1200 wrapped around the primary line 1100 to maintain constriction about the primary line 1100. After being transitioned to the constrained state, the tethering system 1000 will generally remain in the constrained state until an intervention occurs to release the constriction of the secondary line 1200 about the primary line 1100. Accordingly, in various embodiments, transitioning the tethering system 1000 from the constrained state to the free state requires a deliberate manual release of the constriction of the secondary line 1200 about the primary line 1100. As discussed in greater detail below, this transition to the free state can be achieved by rotating the capsule 1300 relative to the secondary line 1200 to cause an interaction therebetween that causes the bail section 1214 of the secondary line 1200 to release, thereby allowing the constriction of the windings section 1100 of the secondary line 1200 to release from the primary line 1100.

In some embodiments, the bail section 1214 may be manipulated in a direction that traverses circumferentially about the longitudinal axis of the primary line 1100, along an outer perimeter of the windings 1212, and in a direction that reduces tension in the windings 1212. This circumferential traversal acts to unwind the mechanical engagement of the bail section 1214 with the windings 1212, thereby allowing the windings to expand in diameter and reduce constriction of the primary line 1100. For example, if the free end 1202 of the secondary line 1200 is wound about the primary line 1100 in a clockwise direction to form the locking section 1210—including the plurality of windings 1212 (clockwise windings under the "right-hand" rule of engineering)—then the bail section 1214 would be traversed in the clockwise direction (i.e., in the direction of the windings) to reduce tension and enable transition to the free state. Conversely, for a left-handed (counterclockwise) winding configuration, the bail section 1214 would be displaced in a counterclockwise direction to reduce tension and enable transition to the free state. This action of traversing the bail section 1214 circumferentially about the longitudinal axis of the primary line 1100, along the outer perimeter of the windings 1212, and in the direction that reduces tension in the windings 1212 is hereinafter referred to as "releasing the bail section" or "when the bail section is released" or other reasonable variations thereof.

In summary, when the bail section 1214 is released, the bail section 1214 no longer traps the windings 1212 against the primary line 1100, allowing the windings 1212 to expand slightly and reduce their constriction. This release transitions the system from the constrained state to the free state, in which frictional engagement between the windings 1212 and the primary line 1100 is sufficiently diminished to permit translation of the secondary line 1200 and capsule 1300 along the longitudinal length of the primary line 1100 with comparatively less force. In this way, the bail section 1214 operates as a toggling mechanism, shifting the system 1000 between fixed and adjustable configurations.

FIGS. 5A and 5B illustrate the system 1000 in the free state after the bail section 1214 has been released. The cross-sectional view of FIG. 5A is taken longitudinally outwardly of the outermost winding of the bail section 1214 of the locking section 1210, showing the locking section 1210, including the windings 1212 and bail section 1214 positioned within the internal cavity 1308 of the capsule 1300. The cross-sectional view of FIG. 5B is taken longitudinally inwardly of the outermost winding of the bail section 1214 of the locking section 1210 between successive windings 1212 and at the inner most winding, where the secondary line 1200 transitions from the windings to the free end 1202 that extends from the capsule 1300 through the through-hole 1310. As such, it will be appreciated that FIGS. 5A and 5B are taken at the same longitudinal positions along the primary line 1100 as FIGS. 4A and 4B, respectively, but with the system 1000 in a free state as opposed to the constrained state shown in FIGS. 4A and 4B.

As shown in FIG. 5A, the capsule 1300 has been rotated about the primary line 1100 to a position where the bail release feature 1320 has engaged and caused the bail section 1214 to traverse circumferentially about the longitudinal axis of the primary line 1100, along the outer perimeter of the windings 1212, and in the counterclockwise direction. Specifically, the capsule 1300 has been rotated approximately sixty (60) degrees counterclockwise, causing the bail release feature 1320 at the three (3) o'clock position (shown in FIG. 4A) to rotate to approximately the one (1) o'clock position (shown in FIG. 5A). The rotation of the capsule 1300 has caused the bail release feature 1320 to engage the bail section 1214 and cause its circumferential traversal from approximately the one (1) o'clock position (shown in FIG. 4A) to approximately the twelve (12) o'clock position (shown in FIG. 5A). This circumferential traversal of the bail section 1214 has caused the windings 1212 to expand in diameter and reduce constriction of the primary line 1100 as shown in FIGS. 5A and 5B.

In some embodiments, the secondary line 1200 is wrapped in a configuration consistent with a Prusik knot, which is a well-known friction hitch. Those of skill in the art will appreciate that a Prusik knot generally comprises a loop of line passed around a primary line and then through itself multiple times to form several barrel-shaped windings. The windings section in a Prusik knot may be either symmetric or asymmetric. In a symmetric configuration, an equal number of windings exists on either side of the free end, which extends from between the bail section and the primary line. This symmetry facilitates even load distribution and the bail section pulls directly from both sides of the windings, thereby providing for equal bidirectional movement (and arrestment) along the longitudinal length of the primary line. In an asymmetric configuration, the number of windings on either side of the free end differs. This asymmetry leads to uneven load distribution and directional bias in gripping performance along the primary line.

In other embodiments, the secondary line 1200 may be wrapped in a configuration consistent with a Klemheist Knot, which is another well-known friction hitch. Those of skill in the art will appreciate that a Klemheist Knot generally comprises a loop of line wrapped in one direction around a primary line (like a helical wrap), and then the free end of the looped line is pulled through its tail end such that it passes between the tail end and the primary line such that the tail end forms the bail section. The unidirectional nature of the windings causes this knot to tighten disproportionately in one direction. Klemheist knots are known to prevent movement in the direction of the wraps (i.e., in a direction extending from the bail toward the first winding), while enabling translation of the windings along the primary line in the opposing direction (i.e., in a direction extending from the first winding toward the bail).

Figure 6:
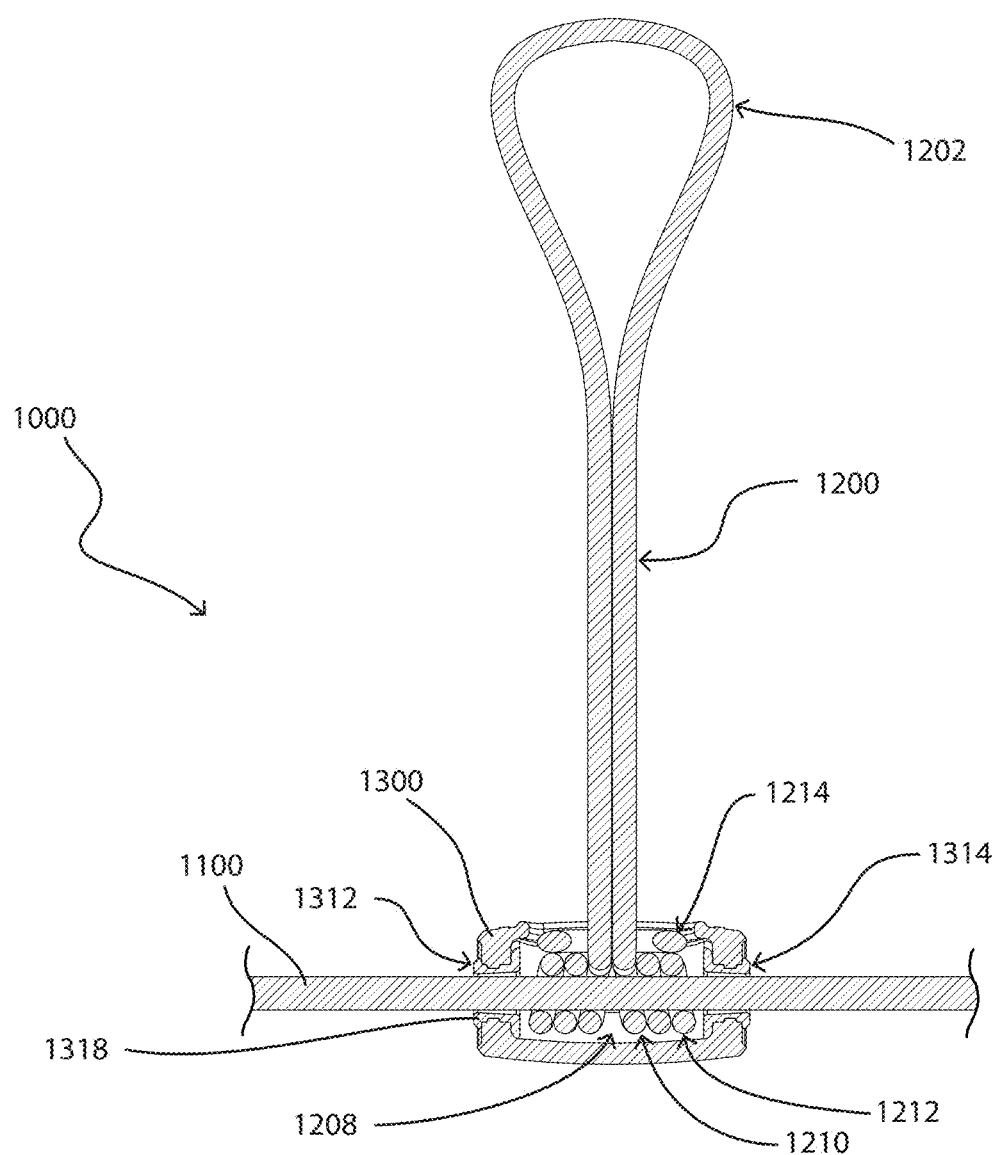
FIG. 6 illustrates a cross-sectional view of the tethering system taken along line A-A of FIG. 1A showing internal arrangement of the primary and secondary lines within the capsule according to certain embodiments.

Turning now to FIG. 6, a cross-sectional view of the system 1000 taken along line A-A in FIG. 1A is shown and described. As shown, the system 1000 is assembled such that the locking section 1210, including at least the plurality of windings 1212 and the bail section 1214 are housed within the internal cavity 1308 of the capsule 1300. Additionally, as depicted, the primary line 1100 extends into the capsule 1300 and passes through an interior of the plurality of windings 1212—also referred to herein as a barrel section of the windings 1212.

To accommodate this configuration, the capsule 1300 includes a first primary line through-hole 1312 and a second primary line through-hole 1314, each positioned at opposite ends of the capsule 1300. These through-holes are sized and shaped to permit passage of the primary line 1100 through the capsule 1300 such that it remains generally longitudinally aligned with a longitudinal axis of the windings 1212 of the locking section 1210 during operation. In some embodiments, the system 1000 further includes a plurality of washers 1318 positioned within the through-holes 1312 and 1314, through which the primary line 1100 extends. In some embodiments, washers 1318 operate to reduce friction between the primary line 1100 and the capsule 1300. In some embodiments, the washers additionally or alternatively operate to retain the locking section 1210 within the interior cavity 1308 of the capsule 1300.

In some embodiments, the washers 1318 are press-fit into the respective ends of the capsule 1300. This press-fit arrangement is particularly advantageous when the capsule 1300 is formed from a material having low stiffness, as it introduces localized structural rigidity in the region surrounding the washers. In such configurations, the washers 1318 operate to help transmit axial force—imparted to the capsule 1300 by a user—into the locking section 1210 via the windings 1212, thereby inducing translation of the secondary line 1200 along the longitudinal axis of the primary line 1100. Stated differently, in some embodiments, when the capsule 1300 is gripped and translated along the longitudinal axis of the primary line 1100 by the user, the washers 1318 also translate. As the washers 1318 translate, a portion of the washer interior to the capsule 1300 will contact the outermost winding of the locking section 1210 and thereby transmit force to the windings vectored along the longitudinal axis of the primary line 1100. The transmission of this force to the windings 1212 induces them— and thereby the secondary line 1200—to translate along the primary line 1100.

While washers 1318 are beneficial—from the standpoint of helping provide rigidity—in certain configurations (e.g., where stiffness is low to moderate; Shore A hardness below 60 A), washers are not required. For example, in embodiments where the capsule 1300 is formed from a rigid or semi-rigid material (e.g., Shore A hardness greater than 60 A), washers 1318 may be optionally omitted without departing from the overall functional intent of the tethering system 1000.

As noted above, releasing the bail section 1214 is essential to transitioning the system 1000 from its constrained state (where translation is restricted) to its free state (where capsule 1300 and secondary line 1200 can be translated along primary line 1100). However, with the locking section 1210 positioned within the interior cavity 1308 of the capsule 1300—thereby enclosing windings 1212 and bail section 1214—the bail section 1214 isn't directly accessible to the user. In this configuration, the capsule 1300 must be configured such that the bail section 1214 can be selectively released by the user.

In embodiments where the capsule 1300 is rigid, external access to manipulate the bail section 1214 must be mediated through either an integrated feature of the capsule 1300 that resides within the internal cavity 1308, like bail release feature 1320, or alternatively through a feature connected directly to the bail section 1214 that is accessible from a location exterior to the capsule 1300 (e.g., a tab or tether connected to the bail section that extends outside of the capsule 1300).

While described above in relation to a rigid capsule, it is to be appreciated that various embodiments include a bail release feature that is not dependent on the presence of a capsule (e.g., capsule 1300). That is, while certain embodiments include both a capsule and a bail release feature— wherein the bail release feature may be integrally formed with the capsule, mechanically coupled to the capsule, or implemented via deformation or manipulation of the capsule itself to reduce constriction of the windings about the primary line—other embodiments include a bail release feature independent of any capsule structure. In such embodiments, the bail release feature may take any suitable form operable to release the bail and thereby enable a reduction of the constriction of the windings about the primary line without requiring the capsule to facilitate or assist in the constriction reduction.

Figure 7A:
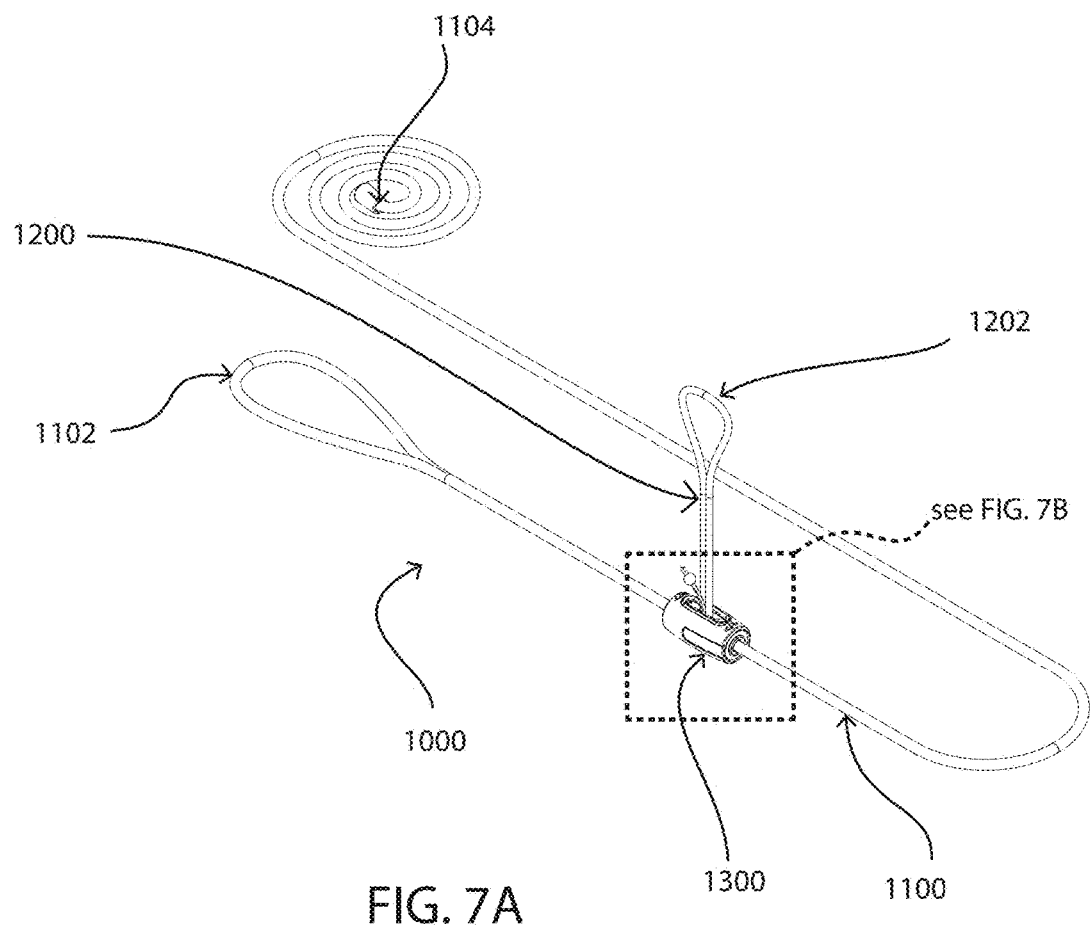
FIG. 7A illustrates a perspective view of an adjustable tethering system according to certain embodiments.
Figure 7B:
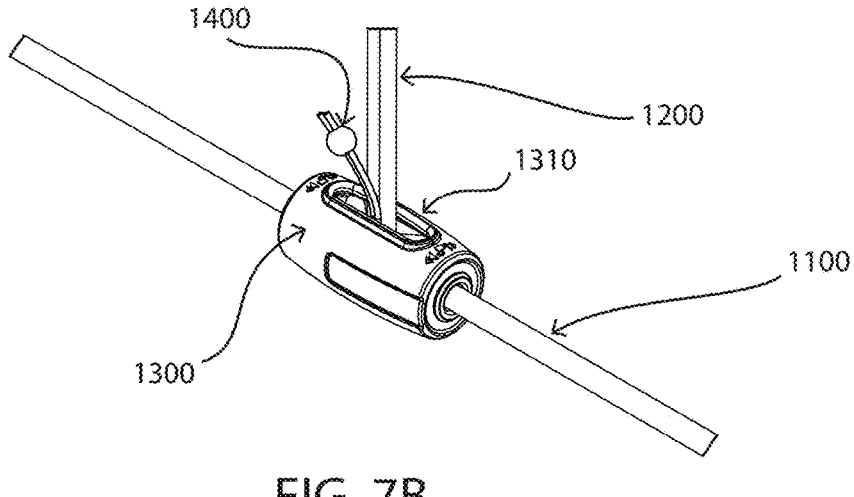
FIG. 7B is an enlarged view of the dashed-line boxed region of FIG. 7A.
Figure 8A:
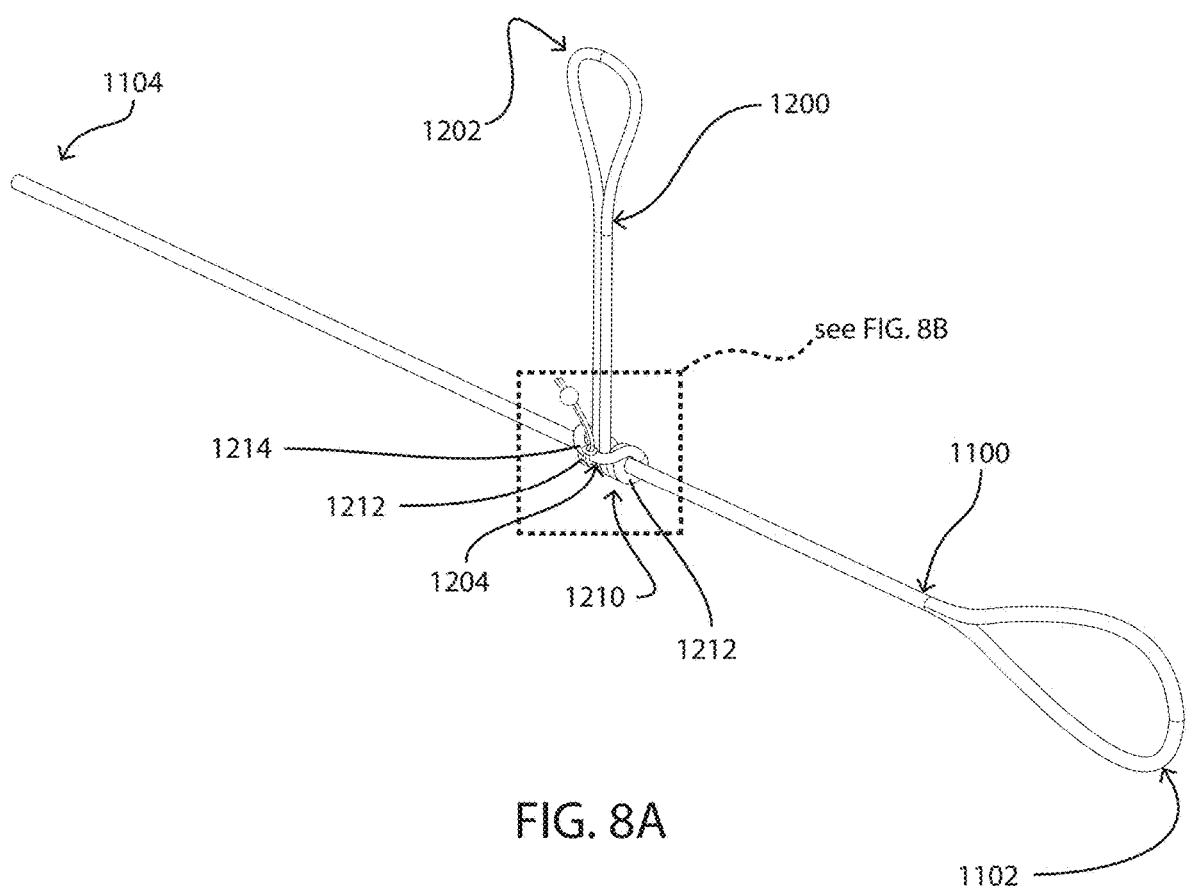
FIG. 8A illustrates a perspective view of an adjustable tethering system with the capsule removed for clarity according to certain embodiments.
Figure 8B:
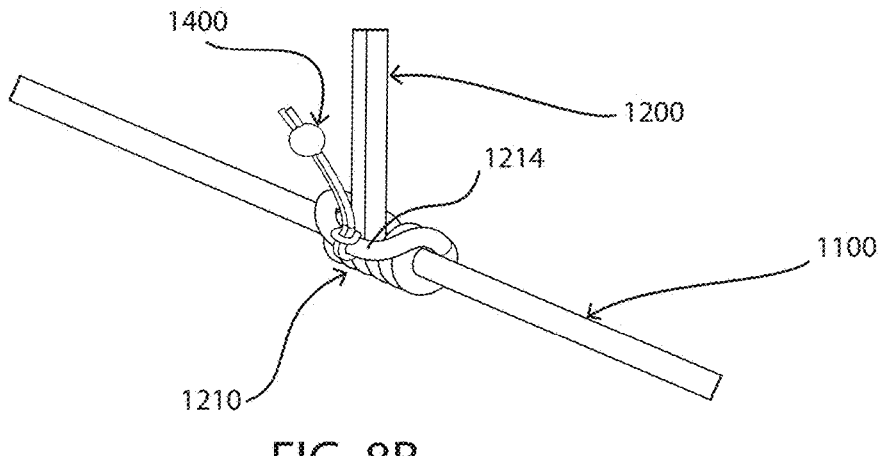
FIG. 8B is an enlarged view of the dashed-line boxed region of FIG. 8A.

With reference now to FIGS. 7A to 8B, system 1000 includes a bail release feature 1400, which is implemented as a component physically distinct from capsule 1300. FIG. 7B is an enlarged view of the dashed-line boxed region of FIG. 7A. FIG. 8A illustrates the arrangement of the system 1000 shown in FIG. 7A, with capsule 1300 removed for illustrative clarity. FIG. 8B is an enlarged view of the dashed-line boxed region of FIG. 8A. As shown in FIGS. 7A and 7B, the bail release feature 1400 extends exterior to the capsule 1300 such that it is graspable. As shown in FIGS. 8A and 8B, bail release feature 1400 is coupled to bail section 1214 of locking section 1210.

As previously described, the bail release feature 1400 may take the form of a cord, tab, handle, or other structure that is graspable by a user. In such embodiments, the system 1000 enables a user to directly manipulate the bail section 1214—independent of any capsule 1300—to induce a release. As detailed above, displacing the bail section 1214 in a direction that reduces tension in the windings 1212 functions to reduce their constriction about the primary line 1100. Accordingly, the bail release feature 1400 provides a direct interface for initiating a transition of the system 1000 from the constrained state to the free state. The coupling between the bail release feature 1400 and the bail section 1214 may be achieved through various techniques, including knotting, stitching, adhesive bonding, or mechanical fastening.

In operation, the bail release feature 1400 is grasped and displaced by the user in a direction corresponding to the winding direction of the secondary line 1200. This manipulation applies a displacement force to the bail section 1214, which in turn reduces the tension and associated constriction of the windings 1212 about the primary line 1100 (see discussion above). Accordingly, the bail release feature 1400 allows the user to articulate the bail section 1214 circumferentially around the primary line 1100 to initiate release. In embodiments lacking a capsule or where the capsule plays no role in releasing the bail section 1214, the bail release feature 1400 functions as a standalone mechanism for facilitating the transition from the constrained state to the free state.

Turning back now to FIG. 6, in instances where the bail release feature is an integrated feature residing within the internal cavity 1308, this bail release feature 1320 physically engages the bail section 1214 to release it—thereby reducing tension in the windings 1212 and transitioning the system 1000 to the free state—when the capsule 1300 is rotated in the direction of the windings, about the longitudinal axis of the primary line 1100 and relative to the secondary line 1200. In instances where the bail release feature 1320 is coupled directly to the bail section 1214, pulling on the bail release feature 1320 in the direction of the windings 1212 operates to release the bail and thereby reduce tension in the windings 1212 and transition the system 1000 to the free state. Accordingly, in rigid configurations, without the presence of a mediating structure—like the bail release feature

1320—direct manipulation of the bail section 1214 is not possible, making transition of the system 1000 from the constrained state to the free state difficult or even impossible.

In embodiments where the capsule 1300 is nonrigid, external access to manipulate the bail section 1214 can likewise be mediated through an integrated internal feature, like the bail release feature 1320 described above, or mediated through a feature connected directly to the bail section 1214. Additionally or alternatively, the capsule 1300 itself may be constructed from an elastically deformable material (e.g., silicone or thermoplastic polyurethane) with a suitable hardness (e.g., Shore 40 A-60 A) that allows manual deformation by the user. In such embodiments, a user may grip and deform the capsule 1300 while simultaneously rotating it relative to the bail section 1214. This combined deformation and rotation can cause the bail section 1214 to release, thereby reducing tension in the windings 1212 and transitioning the system 1000 to the free state. In these embodiments, the bail release feature need not be something protruding from an interior cavity wall of the capsule 1300, but may instead be a geometrical user induced deformation of the capsule 1300, where the geometrical deformation results in an interference of the capsule 1300 with the bail section 1214 of the secondary line 1200 sufficient to release the bail when the capsule 1300 is rotated about the longitudinal axis of the primary line 1100 relative to the secondary line 1200. Without the ability to mediate such manipulation—either through an internal mechanism or through deformation—the bail section 1214 cannot be released, and the tethering system 1000 will remain in its constrained state making translation of the capsule 1300 undesirably difficult or even impossible.

While the present disclosure describes configurations including a primary line and a secondary line that is distinct and separate from the primary line, it should be appreciated that hitch knots with windings, a bail section, and a free end extending from between the bail section and a portion of a line extending through the windings is achievable with a single unitary line. That is, two distinct lines are not required to achieve a configuration where a capsule can be used to release a bail section of a hitch knot, and thereby release a tension in a series of windings that are arresting translation of the windings along a section of line extending through the windings.

It is to be appreciated that the looped end 1202 of the secondary line 1200 need not be in the form of a loop. Alternative configurations are envisioned provided that the corresponding section of the secondary line 1200 extending from the capsule 1300 can be tensioned to cause the plurality of windings to tighten about the primary line 1100. For example, alternative configurations include free ends decoupled from one another, free ends knotted together, or free ends coupled in any other manner provided they can be tensioned to cause the plurality of windings to tighten about the primary line 1100.

TEST EXAMPLE 1: In a test of the system 1000, a force of 400 lbf was applied to the secondary line looped end 1202 while holding the primary line looped end 1102 fixed. Under such loading, the capsule 1300 did not translate along the longitudinal length of the primary line 1100. After removing the load from the secondary line looped end 1202, the capsule 1300 was rotated about the primary line 1100. This rotation caused the bail release feature 1320 of capsule 1300 to engage the bail section 1214 of the secondary line 1200, and thereby release the bail. Thereafter, the capsule 1300 could be translated along the longitudinal length of the primary line 1100 upon a force of approximately 6 lbf applied directly to the capsule 1300 in the longitudinal direction of the primary line 1100. In this TEST EXAMPLE 1: primary line 1100 diameter was 9 mm; secondary line 1200 diameter was 6 mm; primary line 1100 material was polyester with a nylon core; secondary line 1200 material was UHMWPE; capsule 1300 material was silicone with Shore A hardness 40 A.

TEST EXAMPLE 2: In a test of the system 1000, a force of 400 lbf was applied to the secondary line looped end 1202 while holding the primary line looped end 1102 fixed. Under such loading, the capsule 1300 did not translate along the longitudinal length of the primary line 1100. After removing the load from the secondary line looped end 1202, the capsule 1300 was rotated about the primary line 1100. This rotation caused the bail release feature 1320 of capsule 1300 to engage the bail section 1214 of the secondary line 1200, and thereby release the bail. Thereafter, the capsule 1300 could be translated along the longitudinal length of the primary line 1100 upon a force of approximately 8 lbf applied directly to the capsule in the longitudinal direction of the primary line 1100. In this TEST EXAMPLE 2: primary line 1100 diameter was 11 mm; secondary line 1200 diameter was 8 mm; primary line 1100 material was polyester with a nylon core; secondary line 1200 material was UHMWPE; capsule 1300 material: silicone.

In various embodiments, the frictional performance of the tethering system 1000—particularly the ability of the secondary line 1200 to reliably constrict around and release from the primary line 1100—is influenced by the relative diameters of the two lines. In general, it has been observed that a suitable functional relationship exists when the diameter of the secondary line 1200 is less than that of the primary line 1100. For example, in some embodiments, the diameter of the secondary line 1200 may fall within a range of approximately 60% to 80% of the diameter of the primary line 1100. Ratios within this range have been found to balance secure frictional engagement with effective releasability. If the secondary line 1200 is significantly smaller in diameter, the resulting increase in constriction may inhibit reliable release. Conversely, if the secondary line 1200 diameter approaches or exceeds that of the primary line 1100, the system may exhibit insufficient locking force under load or require a greater number of windings 1212 to achieve reliable engagement.

In addition to dimensional considerations, the material sets of the primary and secondary lines (1100 and 1200) also influence the system's locking and release behavior. In some embodiments, the primary line 1100 and the secondary line 1200 are formed from different polymeric fiber types, selected to optimize complementary performance characteristics. For instance, the primary line 1100 may be formed from a relatively durable, UV-stable, and low-elongation material, such as polyester, while the secondary line 1200 may be formed from a high-strength, low-friction fiber, such as UHMWPE. The combination of these differing material properties facilitates secure constriction during loading and controlled release upon manipulation. It is to be appreciated, however, that these examples are nonlimiting, and a wide range of materials—such as nylon, aramid, polypropylene, or various high-performance synthetic blends—may be used for either or both lines. In various embodiments, the material sets are selected to optimize both frictional engagement under load and wear resistance over repeated constriction and translation cycles. Those of skill in the art will recognize that the selection of appropriate material sets may depend on anticipated use conditions, including mechanical load, abrasion potential, moisture exposure, and UV degradation.

Aspects of this disclosure have been described by way of example only and it should be appreciated that modifications and additions may be made thereto without departing from the scope thereof. No embodiment or aspect of an embodiment is intended to be essential or absolute with respect to any other embodiment or aspect. No reference to components or structures being coupled or otherwise connected is intended to limit the same to a direct coupling unless expressly stated as such.

Various modifications and additions can be made to the exemplary embodiments discussed without departing from the scope of this disclosure. For example, while the embodiments described above refer to particular features, the scope of this disclosure also includes embodiments having different combinations of features and embodiments that do not include all of the described features. Accordingly, the scope of this disclosure is intended to embrace all such alternatives, modifications, combinations, and variations that fall within the scope of the claims, together with all equivalents thereof.

What is claimed is:

1. An adjustable tethering system comprising:
a primary line having a longitudinal length;
a secondary line defining a bail section and an attachment section, the bail section of the secondary line being wound about the primary line in a first winding direction such that the secondary line further defines a plurality of windings with the bail section extending transversely across the plurality of windings, the secondary line being releasably slidable along the longitudinal length of the primary line;
a capsule having an internal cavity, wherein the plurality of windings of the secondary line are positioned within the internal cavity; and
a graspable bail release feature that, when manipulated to cause the bail section to translate in a direction opposite the winding direction, reduces a constriction of the plurality of windings about the primary line.

2. The adjustable tethering system of claim 1, wherein the graspable bail release feature is wrapped around the bail section of the secondary line and includes a free end that extends outwardly from the bail section of the secondary line.

3. The adjustable tethering system of claim 1, wherein the graspable bail release feature is permanently affixed to the bail section of the secondary line and includes a free end that extends outwardly from the bail section of the secondary line.

4. The adjustable tethering system of claim 3, wherein the graspable bail release feature is a tab that is sewn to the bail section of the secondary line.

5. The adjustable tethering system of claim 1, wherein the attachment section extends outwardly from within the internal cavity to beyond an exterior of the capsule.

6. The adjustable tethering system of claim 1, wherein the adjustable tethering system is configured to secure a watercraft during docking or mooring.

7. The adjustable tethering system of claim 1, wherein the secondary line is wrapped around the primary line to form a Prusik knot.

8. The adjustable tethering system of claim 1, wherein the secondary line is wrapped around the primary line to form a Klemheist knot.

9. An adjustable tethering system comprising:
a primary line having a longitudinal length;

a secondary line wrapped about the primary line to form a plurality of windings, an attachment section, and a bail section, wherein the bail section is defined by a portion of the secondary line that extends transversely across the plurality of windings, the secondary line being wrapped about the primary line such that a tensile force applied to the attachment section causes constriction of the windings about the primary line to arrest translation of the secondary line along the longitudinal length of the primary line;

a capsule having an internal cavity, wherein the plurality of windings of the secondary line are positioned within the internal cavity; and a graspable bail release feature configured to be manipulated to reduce the constriction of the windings about the primary line thereby enabling translation of the secondary line along the longitudinal length of the primary line.

10. The adjustable tethering system of claim 9, wherein the graspable bail release feature is wrapped around the bail section of the secondary line and includes a free end that extends outwardly from the bail section of the secondary line.

11. The adjustable tethering system of claim 9, wherein the graspable bail release feature is permanently affixed to the bail section of the secondary line and includes a free end that extends outwardly from the bail section of the secondary line.

12. The adjustable tethering system of claim 11, wherein the graspable bail release feature is a tab that is sewn to the bail section of the secondary line.

13. The adjustable tethering system of claim 9, wherein the attachment section extends outwardly from within the internal cavity to beyond an exterior of the capsule.

14. The adjustable tethering system of claim 9, wherein the adjustable tethering system is configured to secure a watercraft during docking or mooring.

15. The adjustable tethering system of claim 9, wherein the secondary line is wrapped around the primary line to form a Prusik knot.

16. The adjustable tethering system of claim 9, wherein the secondary line is wrapped around the primary line to form a Klemheist knot.

17. A method of manufacturing an adjustable tethering system, the method comprising:

providing a primary line having a longitudinal length;

winding a secondary line about the primary line in a first winding direction such that the secondary line forms a plurality of windings about the primary line and such that a portion of the secondary line extends transversely across the plurality of windings of the secondary line such that a tensile force applied to an attachment section opposite the portion of the secondary line extending transversely across the plurality of windings causes constriction of the windings about the primary line;

providing a capsule having an internal cavity and positioning the plurality of windings of the secondary line within the internal cavity; and coupling a graspable bail release feature to the secondary line such that, when manipulated to cause the bail section to translate in a direction opposite the winding direction, reduces a constriction of the plurality of windings about the primary line.

18. The adjustable tethering system of claim 17, wherein the plurality of windings of the secondary line are positioned within the internal cavity such that the attachment section of the secondary line extends outwardly from within the internal cavity to beyond an exterior of the capsule.

19. The adjustable tethering system of claim 17, wherein coupling the graspable bail release feature to the secondary line includes wrapping the graspable bail release feature around the bail section of the secondary line such that a free end of the bail release feature extends outwardly from the bail section of the secondary line.

20. The adjustable tethering system of claim 17, wherein coupling the graspable bail release feature to the secondary line includes permanently affixing the graspable bail release feature to the bail section of the secondary line such that a free end of the bail release feature extends outwardly from the bail section of the secondary line.

* * * * *